(12) United States Patent
Ito

(10) Patent No.: US 10,284,743 B2
(45) Date of Patent: May 7, 2019

(54) IMAGE PROCESSING APPARATUS AND METHOD FOR CONTROLLING THE SAME

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 15/724,627

(22) Filed: Oct. 4, 2017

(65) Prior Publication Data
US 2018/0103174 A1   Apr. 12, 2018

(30) Foreign Application Priority Data
Oct. 7, 2016   (JP) .................................. 2016-199409

(51) Int. Cl.
*H04N 1/21* (2006.01)
*G06F 15/00* (2006.01)
*H04N 1/387* (2006.01)

(52) U.S. Cl.
CPC ............. *H04N 1/21* (2013.01); *H04N 1/3877* (2013.01); *H04N 2201/216* (2013.01)

(58) Field of Classification Search
None
See application file for complete search history.

(56) References Cited

U.S. PATENT DOCUMENTS 9,142,006 B2   9/2015   Ito
9,531,911 B2   12/2016  Ito
2013/0077867 A1   3/2013  Shoami et al.

FOREIGN PATENT DOCUMENTS

JP   2012-243026 A   12/2012

*Primary Examiner* — Dov Popovici
(74) *Attorney, Agent, or Firm* — Carter, DeLuca & Farrell LLP

(57) ABSTRACT

An image processing apparatus that performs filtering by reading out an image from an external storage unit, the image being divided into a plurality of banks by a first interleave method according to a transfer length when the image is read out from the external storage unit is provided. The apparatus including: a plurality of local memories; and a control unit configured to divide, into a plurality of pixel fragments, a pixel of a bank which includes at least one of a plurality of pixels needed for the filtering by a second interleave method according to the transfer length and store each of the pixel fragments obtained as a result of division in one of the plurality of local memories in accordance with the transfer length.

17 Claims, 20 Drawing Sheets

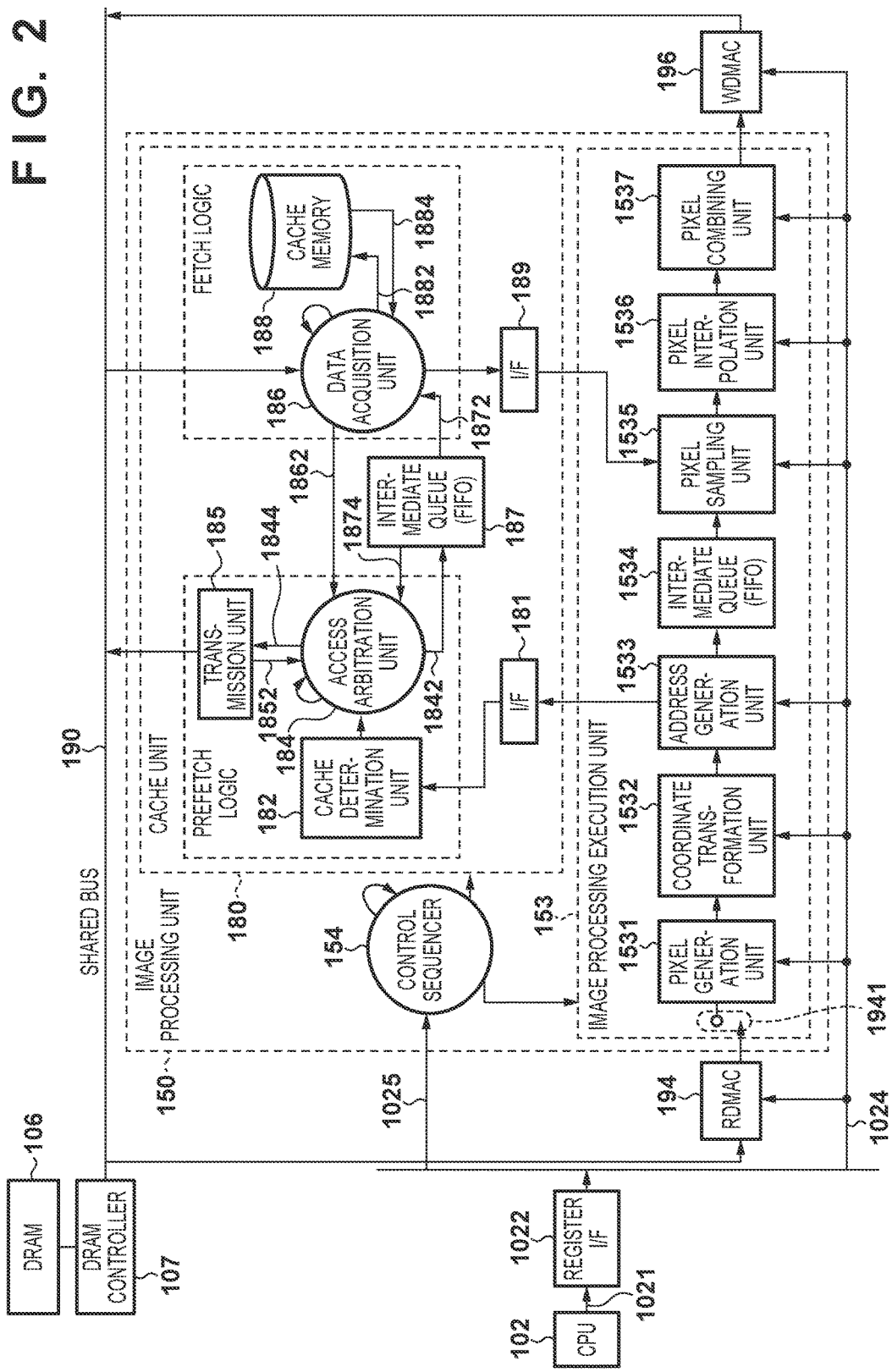

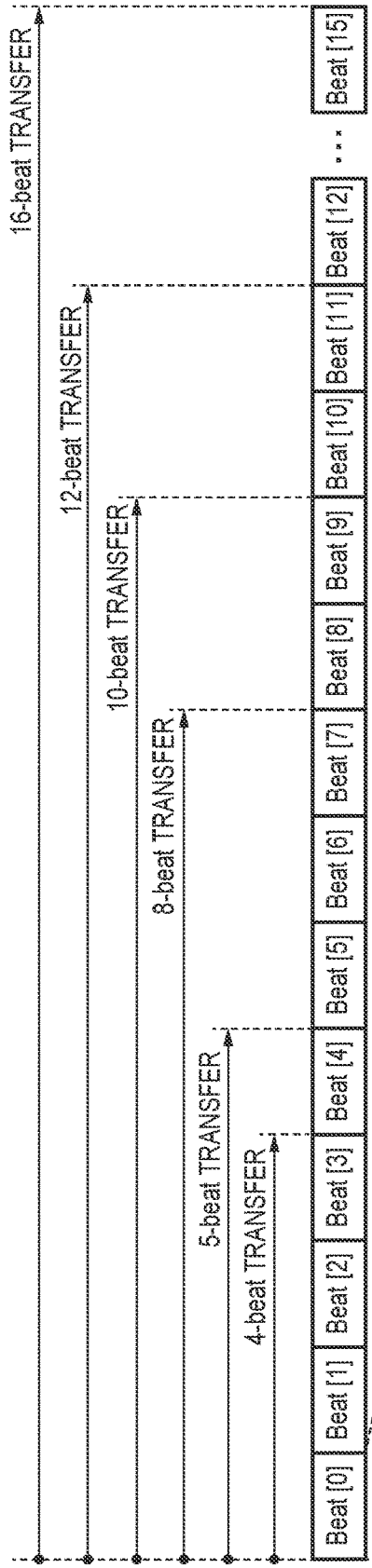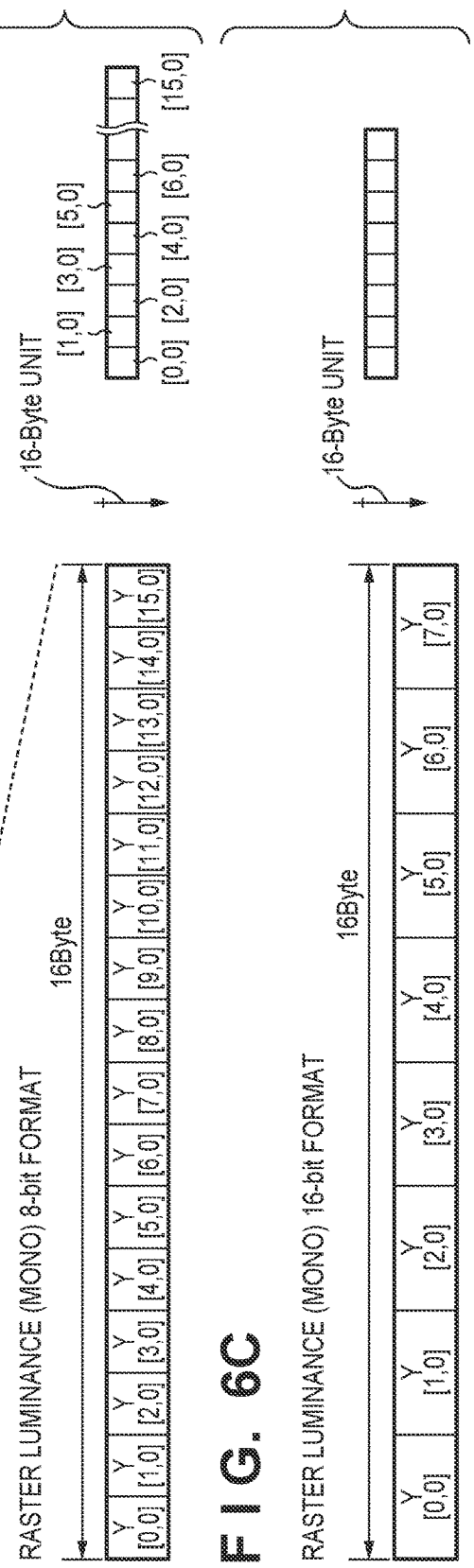

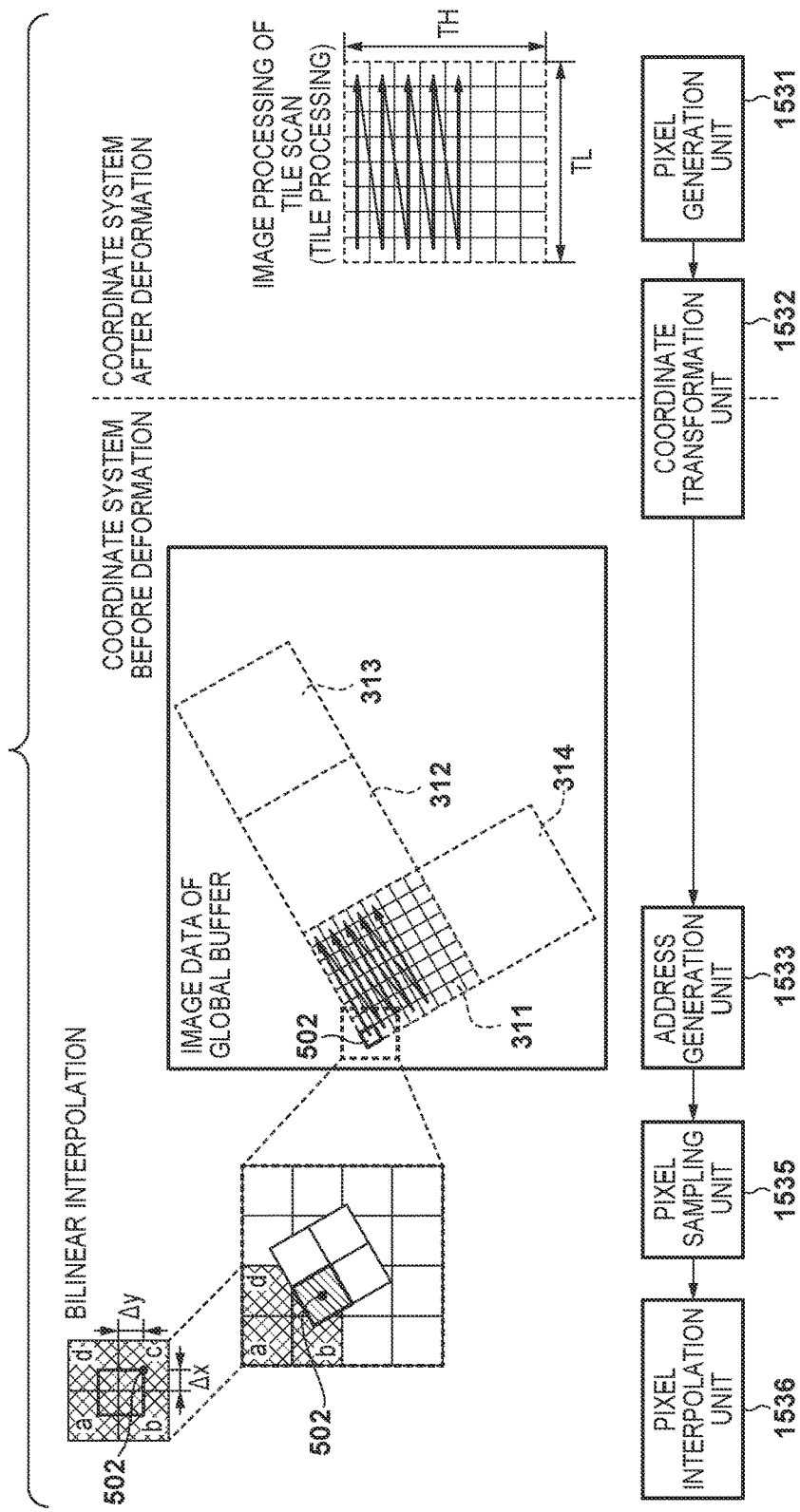

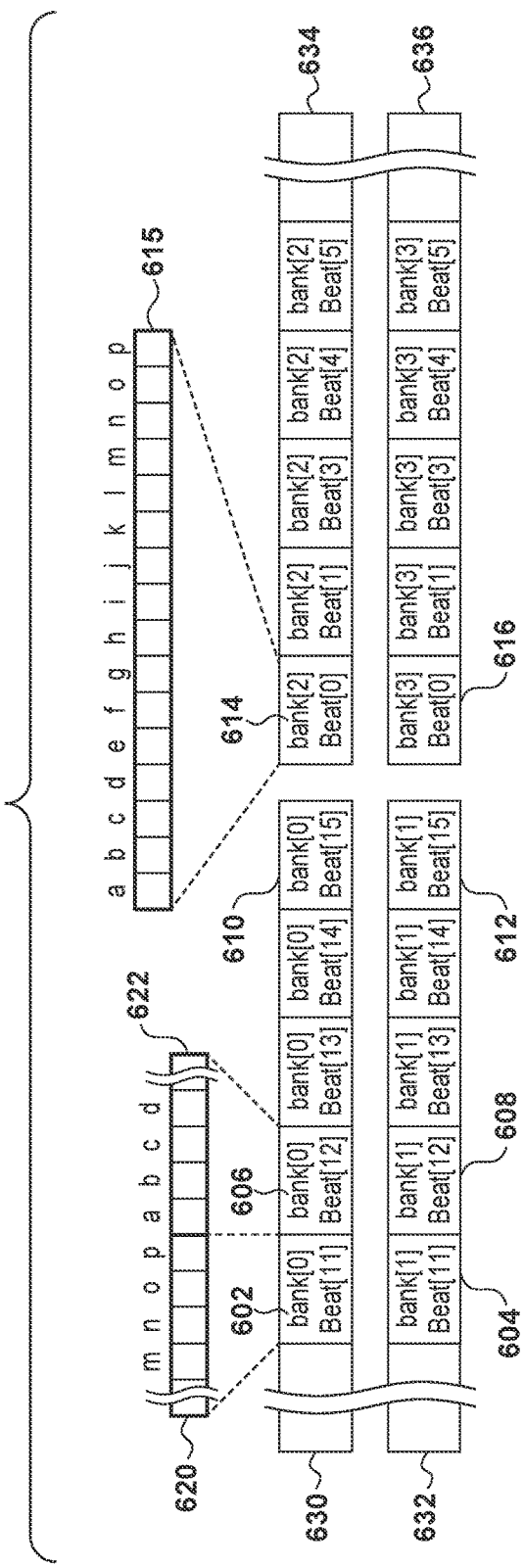

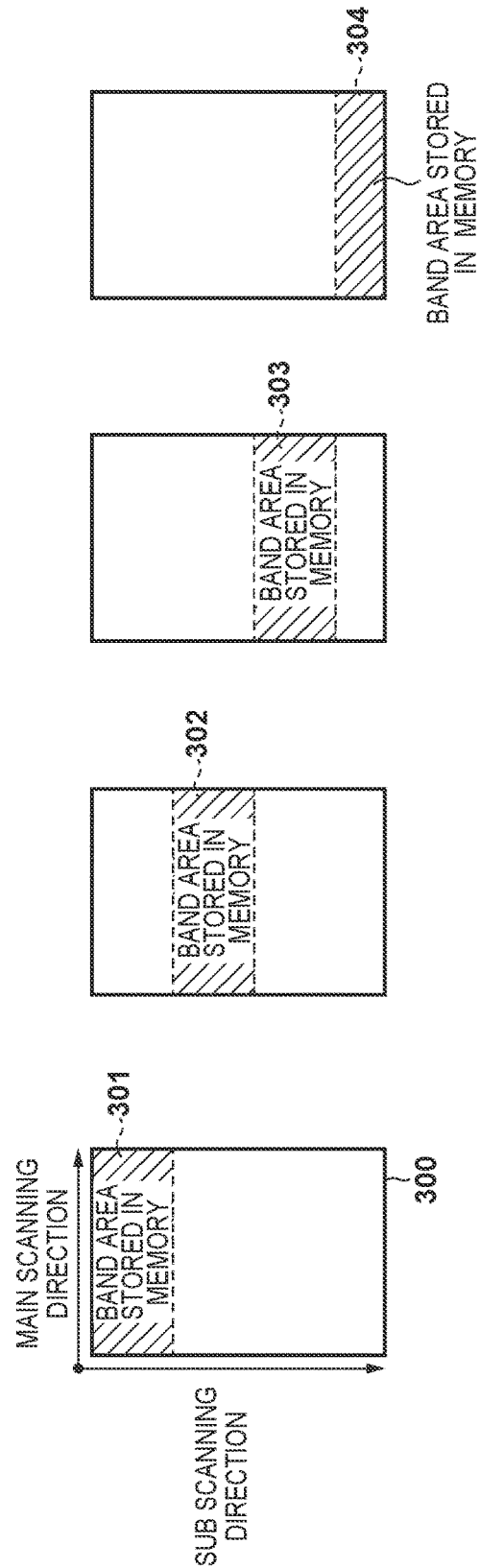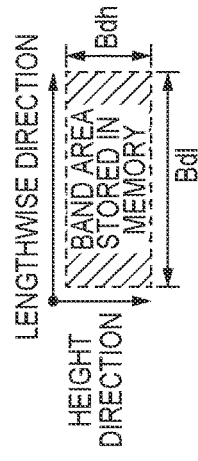

IMAGE PROCESSING APPARATUS AND METHOD FOR CONTROLLING THE SAME

BACKGROUND OF THE INVENTION

Field of the Invention

The present invention relates to an image processing apparatus and a method for controlling the same.

Description of the Related Art

In recent years, various devices are required to achieve both an improvement in processing performance and a greater reduction in cost. A certain type of computer system is installed in each of these devices. It can be said that processing performance per manufacturing cost of the computer system is one of factors for deciding the quality of the device.

The computer system is generally made of a processor and data processing circuit which execute applications, and a storage device such as a memory which stores programs and data to be processed. Ideally, each of the processor and the data processing circuit includes a storage device capable of reading/writing programs and data used by itself at a high speed. The storage device is, for example, a memory unit such as an SRAM having a comparatively low access latency. If such a memory unit can be provided, as a dedicated local memory, for each of the processor and the data processing circuit, the improvement in processing performance is implemented easily.

In order to reduce the cost of the device, however, it is desirable to reduce the number of storage devices to be installed by sharing a single storage device with many processors and data processing circuits. If a memory is adopted as the storage device to be installed, an inexpensive DRAM that is widespread on each occasion is often used. If the DRAM is used, however, the access latency becomes higher than in the case of the aforementioned SRAM. In addition, if many processors and data processing circuits share the single storage device, read/write from each of the processors and data processing circuits to the storage device may conflict. Each access needs arbitration in order to resolve this conflict, increasing access latencies from the processors and data processing circuits. As a result, the processing performance of each of the processors and data processing circuits degrades.

In order to suppress performance degradation of each of the processors and data processing circuits, a cache device is often provided between the storage device, and the processor and the data processing circuit. Each of the processors and data processing circuits does not gain access (data request) to the storage device while it can read out desirable data from the embedded cache device. This decreases the frequency of access (data request) from each of the processors and data processing circuits, making it possible to reduce the needed total amount of access bands. A circuit scale increases by providing the cache devices. It is possible, however, to further suppress an increase in circuit scale as compared with a case in which a dedicated local memory is provided. It becomes possible, by thus providing the cache devices best suited to the computer system, to achieve both high processing performance and a low cost required when the device is implemented.

However, there are types of image processing which are difficult to maintain processing performance in the computer system using such cache devices. As one of the types of such image processing, image processing for deforming a plurality of images different in shape into images of the same shape and combining the plurality of images into one image is given. In this image processing, the respective images are deformed with different deformation parameters so as to have the same shape, and thus they are read out from a memory such as a DRAM while being deformed. At this time, an access pattern to the memory changes greatly for each image. In order to reduce the cost of a processing apparatus, cache memories need to be allocated appropriately to all the plurality of images needed for combination.

Furthermore, in recent years, concerning a DRAM serving as a general storage device configured to store an image before deformation and an image after deformation, an operating frequency in terms of specifications is increased from DDR3 to DDR4 and DDR5 in order to increase processing performance. It is therefore necessary, in order to maintain the performance of the DRAM, to conceal switching of read and write of the DRAM or a latency at the time of a bank conflict by increasing a transfer length per memory access. That is, as for the aforementioned image processing, there are factors (1), (2), and (3). (1) The cache memory needs to be controlled to a predetermined capacity. (2) The access pattern to the memory when each image is read out changes. (3) The transfer length per memory access increases. Because of these factors, it is difficult to maintain the performance of the aforementioned image processing.

SUMMARY OF THE INVENTION

For example, Japanese Patent Laid-Open No. 2012-243026 discloses a method of maintaining performance by prefetching a needed image and storing it in a cache memory, and concealing the latency of DRAM access. However, a technique described in Japanese Patent Laid-Open No. 2012-243026 cannot cope with a complicated access pattern to a memory caused by an example of the aforementioned image processing and an increase in transfer length per memory access.

A certain aspect of the present invention provides an image processing apparatus which includes a cache device capable of suppressing performance degradation even if the access pattern to the memory changes variously.

The certain aspect of the present invention has the following arrangement.

An image processing apparatus that performs filtering by reading out an image from an external storage unit, the image being divided into a plurality of banks by a first interleave method according to a transfer length when the image is read out from the external storage unit, the apparatus comprising: a plurality of local memories; and a control unit configured to divide, into a plurality of pixel fragments, a pixel of a bank which includes at least one of a plurality of pixels needed for the filtering by a second interleave method according to the transfer length and store each of the pixel fragments obtained as a result of division in one of the plurality of local memories in accordance with the transfer length.

According to an exemplary aspect of the present invention, it is possible to achieve both high processing performance and a low cost in image processing for deforming a plurality of images different in shape into images of the same shape and combining the plurality of images into one image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram showing the function and arrangement of an image processing unit;

FIGS. 6A to 6C are views for explaining a transfer unit;

FIG. 7 is a view for explaining an image deformation;

FIGS. 11A and 11B are views for explaining a method of access to the cache memory;

FIGS. 16A to 16L are views for explaining band areas; and

DESCRIPTION OF THE EMBODIMENTS

Figure 1:
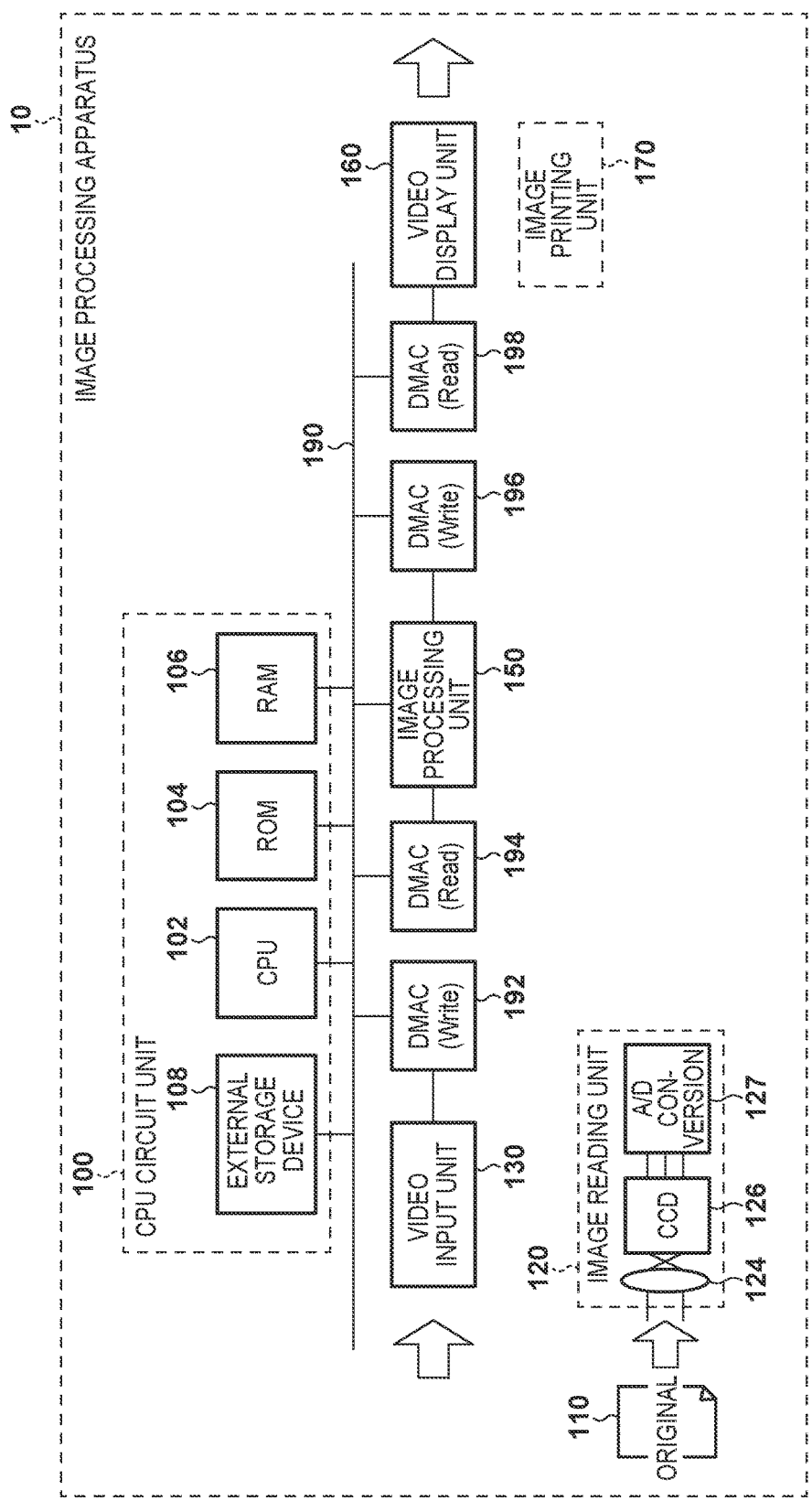
FIG. 1 is a block diagram showing the function and arrangement of an image processing apparatus.

Embodiments of the present invention will be described below with reference to the accompanying drawings. However, the embodiments of the present invention are not limited to embodiments below. The same reference numerals denote the same or similar constituent elements, members, processes, and signals shown in the respective drawings, and a repetitive description will be omitted as needed. Further, some members that are not important from a descriptive point of view are omitted and are not shown in the respective drawings.

First Embodiment

●Overall Arrangement of Apparatus

FIG. 1 is a block diagram showing an example of the overall arrangement of an image processing apparatus (computer) 10 according to the first embodiment. The image processing apparatus 10 performs image processing for performing burst read-out on image data from a memory and deforming an image. The image processing apparatus 10 includes a CPU circuit unit 100, an image reading unit 120, a video input unit 130, an image processing unit 150, a video display unit 160, and an image printing unit 170. The operational overview by these components will be described below.

The image reading unit 120 includes a lens 124, a CCD sensor 126, and an analog signal processing unit 127. Image information of an original 110 is formed on the CCD sensor 126 via the lens 124. The CCD sensor 126 converts the image information into R (Red), G (Green), and B (Blue) analog electrical signals. The pieces of image information converted into the analog electrical signals are input to the analog signal processing unit 127, undergo correction on the respective R, G, and B colors, and then are analog/digital-converted (A/D-converted). Consequently, a full-color digital image signal (pixel value) is generated. The generated digital image signal is input to the video input unit 130, and then input to a DMAC (Direct Memory Access Controller) 192.

A CPU 102 sets in advance the operation of the DMAC 192. The DMAC 192 stores the input digital image signal in a RAM 106 or an external storage device 108 of the CPU circuit unit 100 via a shared bus 190. In the following description, data acquired by aggregating digital image signals including a plurality of pixels so as to form one image will be called image data. In this embodiment, assume that the digital image signal is stored in the RAM 106 in an image data format. When performing image processing, the CPU 102 or an image input/output unit 152 to be described later activates a DMAC 194 to read out image data stored in the RAM 106 and supply a digital image signal corresponding to a pixel to be processed to the image processing unit 150.

The image processing unit 150 is an image data processing apparatus which performs, for example, image processing (for example, correction of the individual variation of the reading element of a sensor device such as a scanner and color correction such as input gamma correction) on an input digital image signal, and generates image data. A DMAC 196 stores the image data having undergone the image processing by the image processing unit 150 in the RAM 106 or the external storage device 108. Note that the DMAC 196 is controlled as follows. For example, the CPU 102 or the image input/output unit 152 to be described later sets in advance the operation of the DMAC 196, and the CPU 102 activates the DMAC 196. Note that as for the operation of the DMAC 196, for example, the operation of writing image data after processing in the RAM 106 is set. The image processing unit 150 executes, on an input digital image signal, image processes for printing an image, such as input color correction processing, spatial filtering, color space conversion, density correction processing, and halftone processing. The image processing unit 150 generates printable image data, and stores the image data in the RAM 106 via the DMAC 196.

A DMAC 198 reads out image data that has undergone image processing and is stored in the RAM 106, and outputs the image data to an image printing unit 170. The image printing unit 170 is, for example, a printer. The setting of the DMAC 198 is performed by, for example, the CPU 102. The image printing unit 170 includes a printout unit (not shown) including an inkjet head, a thermal head, or the like and prints an image on paper based on the digital image signal of input image data.

Although an example has been shown here in which the image printing unit 170 prints out the image data of the original 110 read by the image reading unit 120, the present invention is not limited to this. For example, by using the video input unit 130 or the video display unit 160, desirable image (video) processing may be performed on an input video, and the processed video may be displayed on a video display device (not shown) such as a display.

The CPU circuit unit 100 includes the CPU 102 for arithmetic control, a ROM 104 that holds permanent data and programs, the RAM 106 used to temporarily save data and load a program, and the external storage device 108. The CPU circuit unit 100 controls the image reading unit 120, the image processing unit 150, and the image printing unit 170, and performs centralized control of the sequence of the image processing apparatus 10. The external storage device 108 is a storage medium such as a disk that stores parameters, programs, and correction data used in the image processing apparatus 10. Data and programs held by the RAM 106 may be loaded from the external storage device 108. The RAM 106 according to this embodiment performs data transfer with the image processing unit 150 via the DMACs 194 and 196. However, the storage destination of this transfer data is not limited to the RAM 106 but may be the external storage device 108. The storage destination of the transfer data secured in the RAM 106 or the external storage device 108 will be referred to as a global buffer (external storage buffer) hereinafter. In a description below, the global buffer is secured on the DRAM as an example of the RAM 106, and image data is held in the global buffer.

Image Processing Unit 150

The detailed arrangement and operation of the image processing unit 150 which executes image processing on image data will be described with reference to FIG. 2. FIG. 2 is a block diagram showing an example of the arrangement of the image processing unit 150. FIG. 2 shows the CPU 102 as a component related to the image processing unit 150, a register I/F 1022, the DRAM 106 serving as an external storage device (external memory), a DRAM controller 107, and the shared bus (system bus) 190. In addition, the RDMAC 194 serving as a DMAC (Direct Memory Access Controller) for reading out data and the WDMAC 196 for writing data are provided in order to read/write data from/in the DRAM 106.

Image Processing Execution Unit 153

In the description of the overall arrangement of the aforementioned apparatus, the exemplary function of the image processing unit 150 which implements the image processing of the scanner/printer has been described. An example of image deformation will be described below.

The image processing unit 150 includes a control sequencer 154, the image processing execution unit 153, and a cache unit 180. The CPU 102 performs in advance a predetermined register setting on the components of the image processing unit 150 via the register I/F 1022. Not the image processing of the scanner/printer but image deformation is implemented by, for example, disconnecting an input from the RDMAC 194 (reference numeral 1941 of FIG. 2), generating a pixel by a pixel generation unit 1531 to be described later, and inputting the pixel in a coordinate transformation unit 1532. Note that the input from the RDMAC 194 and the pixel generation unit 1531 may be connected, the value of the input pixel may or may not be modified by the pixel generation unit 1531, and the value may be output to the coordinate transformation unit 1532.

The CPU 102 activates the control sequencer 154 via the register I/F 1022 to give an instruction to start image processing. The control sequencer 154 controls the image processing execution unit 153 and the cache unit 180.

Figures 3C, 3D:
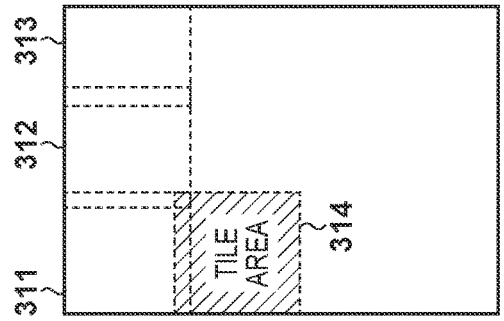
FIGS. 3A to 3E are views for explaining tile areas.
Figures 3A, 3B:
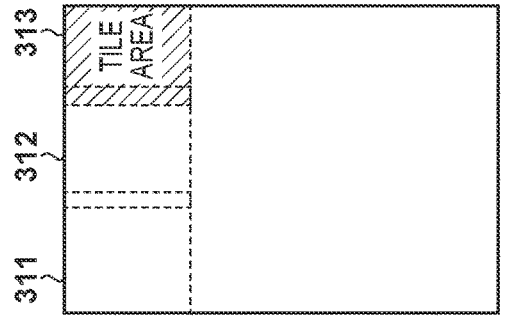
Figure 3E:
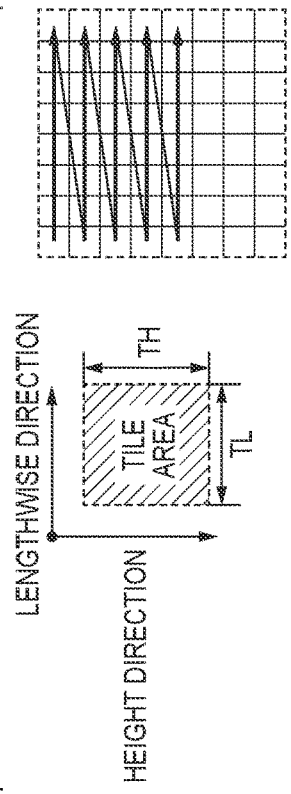

First, the pixel generation unit 1531 of the image processing execution unit 153 is activated upon receiving the instruction from the control sequencer 154 and generates the pixels of a partial image in accordance with a predetermined register value. The pixel generation unit 1531 generates the pixels of the partial image by, for example, dividing the overall of one image data 300 on a tile basis as shown in FIGS. 3A to 3D. The pixel generation unit 1531 also generates pixels by scanning the respective tile areas in an order shown in FIG. 3E. In FIG. 3E, for example, the tile area of 8 pixels×8 pixels is zigzag-scanned in the order of an arrow, generating the pixels of the partial image. At this time, the coordinates of the pixels generated by scanning in an entire image are calculated from the positions (coordinates) of the tile areas in a coordinate system defined for the entire image and the positions (coordinates) of pixels to be scanned in a coordinate system defined for the tile areas. Note that the size of each tile area may not be 8 pixels×8 pixels, and a length TL and height TH of the tile area may be the arbitrary numbers of pixels.

Referring back to FIG. 2, a pixel with a coordinate value generated by the pixel generation unit 1531 is input to the coordinate transformation unit 1532 and undergoes coordinate transformation by the coordinate transformation unit 1532. For example, when a coordinate transformation scheme uses affine transformation, a parameter for affine transformation is set in advance in the register of the coordinate transformation unit 1532. The coordinate transformation unit 1532 calculates a coordinate value after coordinate transformation in accordance with a set parameter value and outputs the obtained value to an address generation unit 1533. Note that the coordinate transformation scheme may be a coordinate transformation method such as UV mapping in a rendering field.

Based on the first address of the global buffer area of the DRAM 106 where image data is stored, an image format to be described later, and the coordinate value after coordinate transformation calculated by the coordinate transformation unit 1532, the address generation unit 1533 calculates the address of the global buffer area. At this time, based on an integer part of the coordinate value after coordinate transformation and a transfer length from the DRAM 106 to be described later, the address generation unit 1533 calculates an address, the position of a pixel in one transfer length, and a fraction part of the coordinate value. The address generation unit 1533 stores, in an intermediate queue (FIFO) 1534, the position of the pixel and the fraction part of the coordinate value. Stored information is used in a pixel sampling unit 1535 and pixel interpolation unit 1536 to be described later. An address calculated by the address generation unit 1533 is input to the cache unit 180 via an I/F 181. The function and operation of the cache unit 180 will be described later. The image processing execution unit 153 reads out needed target data (an image, video, setting value, table, attribute information, and the like) from the DRAM 106 via the cache unit 180 and uses them for data processing.

The pixel sampling unit 1535 fetches information held by the intermediate queue (FIFO) 1534 and waits until image data for pixel interpolation arrives from a cache unit I/F 189. Upon the arrival of the image data for pixel interpolation, based on the position of a pixel in data of one transfer length fetched from the intermediate queue (FIFO) 1534, the pixel sampling unit 1535 extracts a plurality of pixel values needed for pixel interpolation from the image data. The pixel sampling unit 1535 outputs, to the pixel interpolation unit 1536, a fraction part of a coordinate value fetched from the intermediate queue (FIFO) 1534 and the pixel values for pixel interpolation extracted from the image data. The pixel interpolation unit 1536 performs predetermined filter calculation based on the pixel values for pixel interpolation and the fraction part of the coordinate value, calculates pixel values after interpolation, and outputs them to a pixel combining unit 1537. In the first mode, the pixel combining unit 1537 combines a plurality of images and writes a pixel value after combination in the DRAM 106 via the WDMAC 196. In the second mode, the pixel combining unit 1537 does not combine the plurality of images and outputs the pixel values after interpolation by the pixel interpolation unit 1536 without any change to handle deformation in one image. In this embodiment, the pixel combining unit 1537 operates in accordance with the second mode. At the time of output, the pixel combining unit 1537 packs the plurality of pixel values until image data on a processing result becomes the size of the transfer length of the DRAM 106 and sends them to the WDMAC 196 once the data reaches the size of the transfer length. Note that concerning the combination of a plurality of images, a concrete function will be described in another embodiment to be described later.

Cache Unit 180

The operation of the cache unit 180 will be described in detail. If desirable data exists (cache hit) in the cache unit 180, there is no need to access (data request) to the DRAM 106, lowering an access latency. On the other hand, if the desirable data does not exist (cache miss) in the cache unit 180, access (data request) to the DRAM 106 is gained for the desirable data. At this time, the access latency is the same as in a case without any cache device. In general, each of the processor and data processing circuit processes data sequentially, and thus pauses until the desirable data is read out from the DRAM at the time of a cache miss. Processing performance of the processor and data processing circuit degrades by this pause. Such an operation is called a blocking operation. An action to read out data in correspondence with the cache miss is called refill, the readout data is called refill data, a unit read out at once is called a refill length, and a readout period is called a refill latency.

When reading out data from the DRAM 106 via the cache unit 180, the image processing execution unit 153 provides the storage address of data on the DRAM 106 for a cache determination unit 182 via the I/F 181. Then, the cache determination unit 182 determines a cache hit or cache miss based on the provided address.

(Cache Determination Unit 182)

Figure 4:
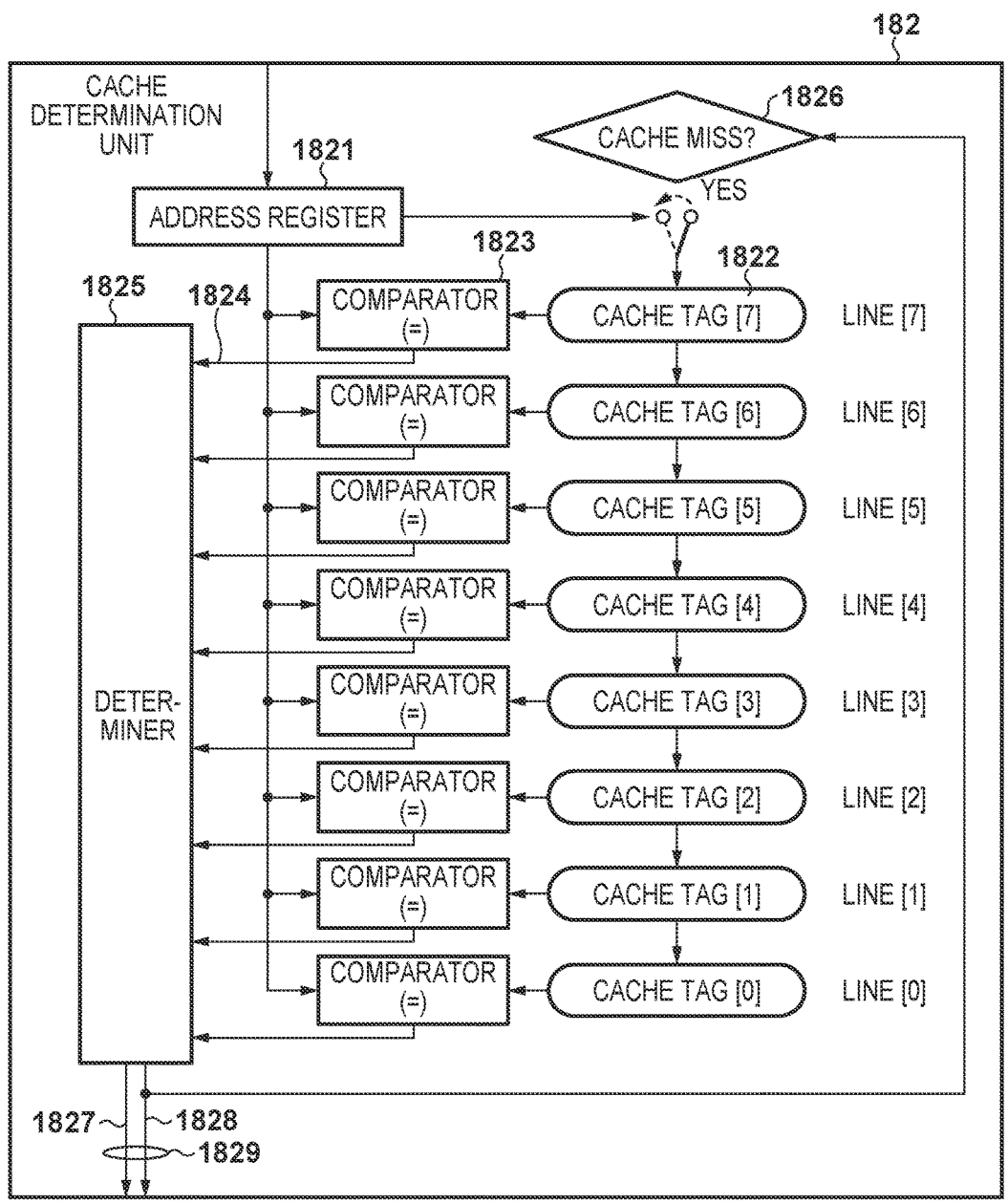
FIG. 4 is a block diagram showing the function and arrangement of a cache determination unit.

An example of the circuit arrangement of the cache determination unit 182 will be described in detail with reference to FIG. 4. The association (line selection) method of the cache unit 180 is a full associative method.

An address register 1821 holds the address input to the cache determination unit 182. The cache determination unit 182 holds eight cache tags 1822, and a cache device of an 8-node full associative method is implemented. Numbers [0] to [7] are allocated in advance to the eight cache tags 1822. Each of these numbers indicates the "relative" cache line number of a corresponding cache memory. The reason that the number is "relative" will be described later. Eight comparators 1823 determine "matches" between the input address of the address register 1821 and the eight cache tags 1822. Eight comparison results 1824 from the comparators 1823 are output to a determiner 1825.

The determiner 1825 determines a cache hit if there is even one "match" out of the eight comparison results 1824. The determiner 1825 determines a cache miss if there exists no "match" in the eight comparison results 1824. A determination result 1829 includes a cache miss flag 1828 and is output from the cache determination unit 182. If the cache miss flag 1828 of the determination result 1829 indicates the cache hit, the determination result 1829 includes a "relative" line number 1827 of the "matched" cache tag.

If the cache miss flag 1828 of the determination result 1829 indicates the cache miss (YES in a branch 1826), the cache tags 1822 are updated by writing the input address in them. Each cache tag 1822 is a storage area formed by a shift register. If the cache miss flag 1828 indicates the cache miss, the values of upstream cache tags move to downstream cache tags by a shift operation. That is, the value of the cache tag [1] is written in the cache tag [0], and the value of the cache tag [2] is written in the cache tag [1], respectively. Writing is repeated in the same manner, and the value of the cache tag [7] is written in the cache tag [6]. Then, the value of the input address is finally written in the cache tag [7]. If the cache miss flag 1828 indicates the cache miss, the cache tags are updated as described above, and the value of the line [7] is output from the cache determination unit 182 as the line number 1827.

A cache tag replacement method of discarding tag information of the old cache tag [0] definitely as described above is called a "FIFO method (round robin method)". In the cache device of the full associative method, the device can be implemented easily, and thus the "FIFO method (round robin method)" is often adopted as the replacement method.

The cache determination unit 182 adds the input address to the determination result 1829 which includes the cache miss flag 1828 and line number 1827 obtained as described above, and outputs it to an access arbitration unit 184 as a cache determination result.

Referring back to FIG. 2, the image processing apparatus 10 according to this embodiment adopts a non-blocking cache mechanism in order to conceal a refill latency as a penalty at the time of a cache miss. In this cache mechanism, information "line number and cache miss flag" to be needed later is saved in an intermediate queue (FIFO) 187 even if the cache determination result indicates the cache miss. Then, cache determination processing for next data is performed in advance before the completion of a process of reading out cache data on the cache miss from the DRAM 106 and storing it in a cache memory 188. By performing such a process, it is also possible to perform cache determination processing for subsequent data while the cache data on the cache miss is refilled from the DRAM 106 to the cache memory 188. Therefore, it becomes possible to suppress performance degradation at the time of a cache miss.

Note that the access arbitration unit 184 fetches input addresses from the cache determination result at the time of a cache miss and sequentially stores them in a transmission unit (FIFO) 185. The DRAM controller 107 receives the input addresses from the transmission unit (FIFO) 185, reads out desirable data (refill data) from the DRAM 106, and writes it in the cache memory 188. A data acquisition unit 186 fetches a "cache miss flag" from the intermediate queue (FIFO) 187 and specifies whether a cache determination result is a cache miss or a cache hit. When the cache determination result is the cache hit, the data acquisition unit 186 reads out cache data from the cache memory 188 directly and sends it to the I/F 189. On the other hand, when the cache determination result is the cache miss, the data acquisition unit 186 updates the cache data and sends the updated cache data to the I/F 189. Such a series of processes, that is, a process of reading out the cache data of the cache miss from the DRAM 106 and updating the cache memory 188 is the aforementioned refill.

(Access Arbitration Unit 184)

The access arbitration unit 184 operates when an input cache determination result is valid and waits at other times. The access arbitration unit 184 performs the following processing in accordance with whether a "cache miss flag" included in the cache determination result is valid/invalid.

When the "cache miss flag" included in the cache determination result is valid (cache miss), the access arbitration unit 184 first evaluates whether the storage areas of the connected transmission unit (FIFO) 185 and intermediate queue (FIFO) 187 are free. The access arbitration unit 184 evaluates the state of a prefetch permission signal 1862 from the data acquisition unit 186. If there are free areas in two FIFOs, and the state of the prefetch permission signal 1862 is "permission", the access arbitration unit 184 writes "line number and cache miss flag" in the intermediate queue (FIFO) 187. The access arbitration unit 184 also writes an address in the transmission unit (FIFO) 185 concurrently. If there is no free area in two FIFOs, or the state of the prefetch permission signal 1862 is not "permission", the access arbitration unit 184 stops (stalls) the cache determination unit 182. Then, the access arbitration unit 184 waits until the storage areas of two FIFOs become free, and the state of the prefetch permission signal 1862 is set "permission".

When the "cache miss flag" included in the cache determination result is invalid (cache hit), the access arbitration unit 184 evaluates whether the intermediate queue (FIFO) 187 is free. If the storage area is free, the access arbitration unit 184 writes "line number and cache miss flag" in the intermediate queue (FIFO) 187. If the storage area is not free, the access arbitration unit 184 stops (stalls) the cache determination unit 182 and waits until the storage area becomes free. In this embodiment, the number of nodes of the cache tags in the full associative method is eight for the sake of descriptive simplicity. However, the number of nodes is not limited to this and in an example, the larger number is more desirable.

Note that the cache determination unit 182 and the access arbitration unit 184 form a prefetch unit (apparatus/circuit/logic) corresponding to the data acquisition unit 186 to be described below. The cache determination unit 182 and the access arbitration unit 184 are linked to a pipeline stage preceding a predetermined pipeline stage that needs data. In that sense, it can be said that preprocessing for the predetermined pipeline stage is performed.

(Data Acquisition Unit 186)

Figure 5A:
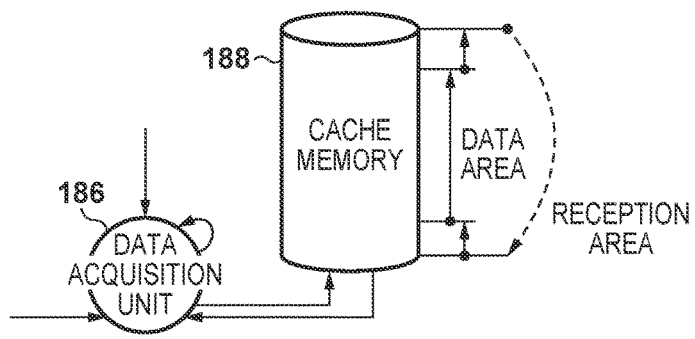
FIGS. 5A to 5C are a view and flowcharts for explaining a data acquisition unit.

The operation of the data acquisition unit 186 will be described in detail with reference to FIGS. 5A to 5C. As shown in FIG. 5A, the cache memory 188 logically includes a "data area" and "reception area, and is physically implemented by a plurality (a plurality of banks) of SRAMs. The data acquisition unit 186 contains information for managing the reception area (reception pointer) and information for managing the data area (data pointer).

Figure 5B:
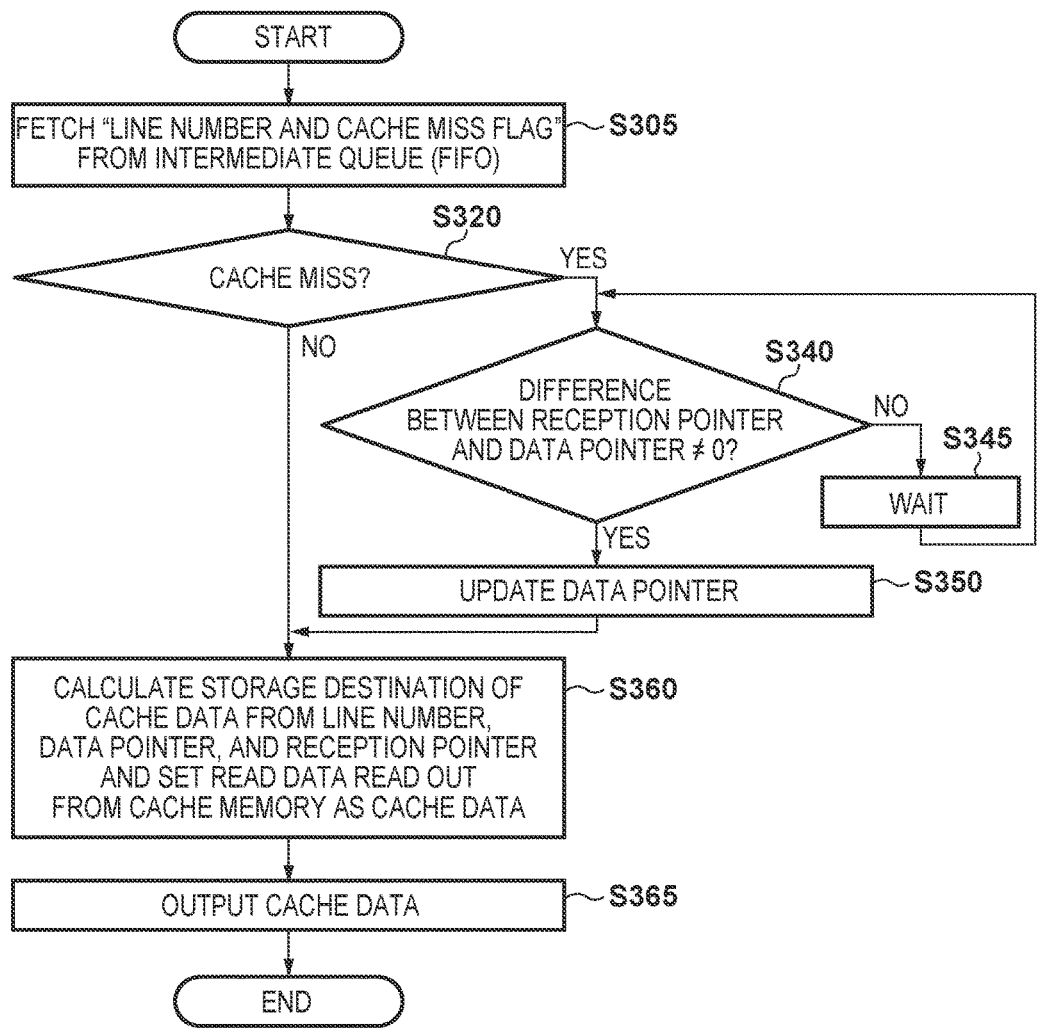
Figure 5C:
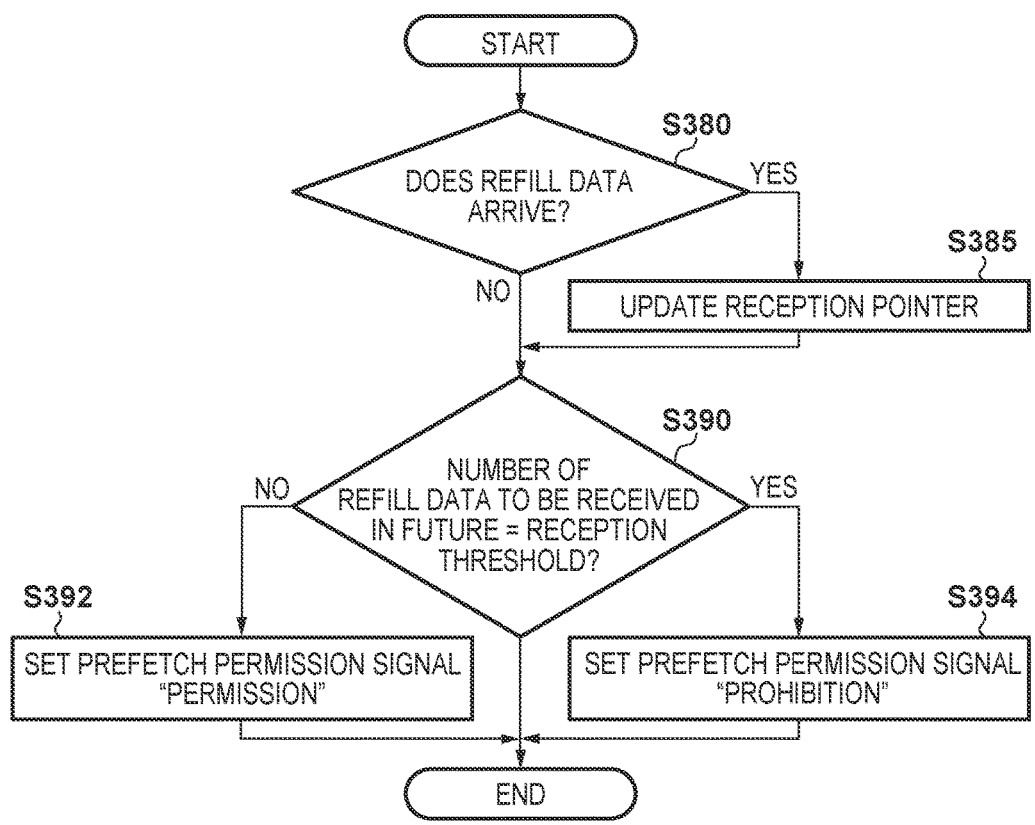

FIG. 5B shows an example of a cache data acquisition operation by the data acquisition unit 186. The data acquisition unit 186 evaluates whether there is data to be processed in the storage area of the intermediate queue (FIFO) 187. The data acquisition unit 186 waits because there is no cache determination result to be processed if the intermediate queue (FIFO) 187 is free. The data acquisition unit 186 fetches, from the intermediate queue (FIFO) 187, the cache determination result to be processed, that is, "line number and cache miss flag" (step S305). The data acquisition unit 186 performs a next cache data acquisition operation in accordance with the value of the cache miss flag as the determination result.

When the cache miss flag is invalid (cache hit), the data acquisition unit 186 fetches, from the intermediate queue (FIFO) 187, a line number, and the reception pointer and data pointer of the cache memory 188. Based on fetched information, the data acquisition unit 186 calculates a storage address on the cache memory 188. Based on the calculated storage address, the data acquisition unit 186 reads out stored data from the cache memory 188 as read data 1884 (step S360). The data acquisition unit 186 sends requested cache data to the image processing execution unit 153 via the I/F 189 (step S365).

When the cache miss flag is valid (cache miss), the data acquisition unit 186 checks a difference between the reception pointer and the data pointer (step S340). When there is no difference (0) between the both pointers (NO in step S340), the data acquisition unit 186 evaluates that refill data requested from the DRAM 106 does not arrive at the cache memory 188 and waits until the refill data arrives (step S345). If there is the difference (value other than 0) between the both pointers (YES in step S340), the data acquisition unit 186 determines that the refill data requested from the DRAM 106 has already been stored in the cache memory 188 and updates the data pointer (step S350). The remaining procedure is the same as a procedure when the above-described cache miss flag is invalid (cache hit).

The data acquisition unit 186 performs a refill data reception operation in parallel with the aforementioned cache data acquisition operation. FIG. 5C shows an example of the refill data reception operation of the data acquisition unit 186. If requested refill data arrives at the data acquisition unit 186 from the DRAM 106 (YES in step S380), the data acquisition unit 186 updates the reception pointer (step S385). The data acquisition unit 186 checks the difference between the reception pointer and the data pointer (step S390). If the difference between the both pointers is equal in number to a predetermined reception threshold (YES in step S390), the refill data cannot be received any more, and thus the data acquisition unit 186 sets the prefetch permission signal 1862 "prohibition" (step S394). If the difference between the both pointers is smaller than the reception threshold (NO in step S390), the refill data can be received from the DRAM 106, and thus the data acquisition unit 186 keeps the prefetch permission signal 1862 "permission" (step S392). In circuit implementation, the access arbitration unit 184 is preceded by the data acquisition unit 186. Therefore, in some cases, it is late even if the access arbitration unit 184 stops access (data request) to the DRAM 106 after receiving the prefetch permission signal 1862 from the data acquisition unit 186. Considering such a difference in latency made by a circuit positional relationship, the above-described reception threshold may be set smaller than the number of reception stages that can be stored. Alternatively, as a stricter method, the number of waits for refill may be defined newly, and the prefetch permission signal 1862 may be generated using the number of waits for refill. The number of waits for refill starts from 0, 1 is added for each cache miss in the access arbitration unit 184, and 1 is subtracted each time refill data arrives at the data acquisition unit 186. That is, the number of waits for refill represents the number of refill data that has not reached a fetch unit yet although the data request is made. The total value of the received number of refill data (the difference between the reception pointer and the data pointer) and the number of waits for refill becomes the number of refill data to be received in the future. If the number of refill data to be received in the future is smaller than the reception threshold, the prefetch permission signal 1862 is set "permission". If the number to be received in the future is equal in number to the reception threshold, the prefetch permission signal 1862 is set "prohibition". At this time, the number to be received in the future and the reception threshold have the same value, making it impossible to receive the refill data any more. Therefore, the data acquisition unit 186 sets the prefetch permission signal 1862 "prohibition", notifies the access arbitration unit 184 of this, and temporarily stops non-blocking access. The prefetch unit stops a data request to an external memory.

The data acquisition unit 186 forms a fetch unit (apparatus/circuit/logic) that acquires the requested data. The data acquisition unit 186 supplies the acquired data to the predetermined pipeline stage.

The cache unit 180 according to this embodiment implements the cache device of the full associative method which performs a non-blocking operation with an extremely simple mechanism. This embodiment is characterized by allocating part of the cache memory 188 to the reception area, and data reception and data holding are synthesized in one storage area. It becomes possible, by integrating a data reception area and a data holding area on the cache memory 188, to change a capacity flexibly, and to implement an appropriate arrangement change according to various operations in image processing. The replacement method of the FIFO method (round robin method) generally adopted in the cache device of the full associative method and usage of the cache memory 188 of this embodiment match. Accordingly, no problem particularly occurs in implementing the cache device of the full associative method.

Transfer Length

A transfer length when a 128-bit bus (16 Bytes) is adopted as an example of the shared bus 190 will be described with reference to FIG. 6A. As described above, the operating frequency of a DRAM standard doubles. As a result, it is impossible to conceal an overhead increased by switching of read and write or a bank conflict and maintain the performance (effective value) of the DRAM unless the transfer length per memory access is increased. For example, when image data is read out from the DRAM 106 in 16-Byte (1-beat or single) transfer for the shared bus 190 of the 128-bit (16-Byte) bus, the performance (effective value) of the DRAM degrades extremely. On the other hand, if continuous (burst) transfers of several to several tens of times are set as a unit per memory access, degradation in performance (effective value) of the DRAM can be alleviated. Therefore, an image processing apparatus capable of changing the transfer length in accordance with the DRAM standard or the operation mode of image processing is desirable. For example, FIG. 6A shows 64-Byte (4-beat) transfer, 80-Byte (5-beat) transfer, 128-Byte (8-beat) transfer, 160-Byte (10-beat) transfer, 192-Byte (12-beat) transfer, and 256-Byte (16-beat) transfer. The image processing apparatus 10 may change the transfer length among them. Note that 128-bit (16-Byte) bus in one transfer length and one-cycle transfer will be referred to as one packet (1 beat).

Image Format (8-Bit Raster)

The structure of image data in this embodiment will be described in detail. In this embodiment, the image data is temporarily stored in an external storage area (global buffer) in the DRAM 106 serving as an external memory. Therefore, the image data is handled using, as a unit, the above-described transfer length that allows the DRAM 106 to read/write without degrading its performance.

For example, FIG. 6B shows image data stored in the DRAM 106 as a raster luminance (mono) of an 8-bit format. Luminance (mono) data "Y" of an 8-bit format is packed in a 16-Byte (1-beat) unit. [0, 0] to [15, 0] in FIG. 6B represent [main scanning coordinate, sub scanning coordinate], and 16 pixels (pixel segments or pixel fragments) are packed in the 16-Byte (1-beat) unit. Therefore, when a transfer length is, for example, 256 Bytes (16 beats), luminance (mono) data of 256 pixels (pixel group) in the range of coordinates [0, 0] to [255, 0] is read/written per memory access. In the following description, the term "pixel segment" and the term "pixel fragment" are used as a synonym.

In the case of an image data format for packing luminance (mono) data "Y" of a 16-bit format, 8 pixels (pixel segments or pixel fragments) are packed in the 16-Byte (1-beat) unit as shown in FIG. 6C. Therefore, when the transfer length is, for example, 256 Bytes (16 beats), luminance (mono) data of 128 pixels (pixel group) in the range of coordinates [0, 0] to [127, 0] is read/written per memory access.

Readout of Pixel Value

In this embodiment, an image is divided into areas in a tile (block) unit, and image processing is performed on each area obtained as a result of the division. FIG. 7 is a view showing an example of image processing. Partial images are extracted from the entire image in the tile (block) unit. As shown in FIG. 7, the pixel generation unit 1531 selects and sequentially processes the pixels of the partial images in a tile scan order (tile processing). Each pixel selected at this time is the pixel after deformation and has a pixel position (coordinate) after deformation. The coordinate transformation unit 1532 calculates, from the pixel position (coordinate) after deformation, a pixel position (coordinate) before deformation in the matrix of affine transformation and sets the calculated pixel position (coordinate) before deformation as the center of a pixel position (coordinate) to obtain. This coordinate value before deformation is the coordinate value of image data stored in the global buffer on the DRAM 106. FIG. 7 shows, for example, a point 502 at the upper left of a tile (block) 311. In this embodiment, in order to calculate a pixel value before deformation using a bilinear pixel interpolation method to be described later, interpolation calculation is performed on the point 502 by using pixel values at four points in its neighborhood. It is therefore necessary to read out, from the DRAM 106, the pixel values at four points (a, b, c, d) near the point 502. The address generation unit 1533 calculates coordinate values at the nearby four points from a coordinate value before transformation and calculates the address value of the global buffer on the DRAM 106 based on them. The pixel sampling unit 1535 reads out, based on the calculated address, four image data before deformation and samples four pixel values.

Pixel Interpolation Method (Bilinear)

The pixel interpolation unit 1536 performs, on the pixel values at the nearby four points (a, b, c, d) of two pixels in a main scanning direction×two pixels in a sub scanning direction, linear interpolation by using, as interpolation coefficients, coordinate fraction parts (Δx, Δy) of a shift amount from the coordinate value at the point 502 (center). The pixel interpolation unit 1536 calculates the pixel value of the point 502 based on the result of the interpolation (bilinear interpolation).

Detailed Cache Configuration

A cache configuration in this embodiment will be described in detail below. A cache according to this embodiment holds a pixel value by dividing image data into a plurality of banks in accordance with the pixel interpolation method (bilinear). This embodiment adopts a pixel value storage method (referred to as "bank interleave") capable of obtaining a plurality of pixel values needed for interpolation concurrently in one cycle. The number of banks obtained as a result of division is calculated by an image data storage format and a pixel interpolation method (a detail of which will be described later). In this embodiment, an image format is an 8-bit raster, and the pixel interpolation method is bilinear, resulting in a four-bank configuration.

Figure 8:
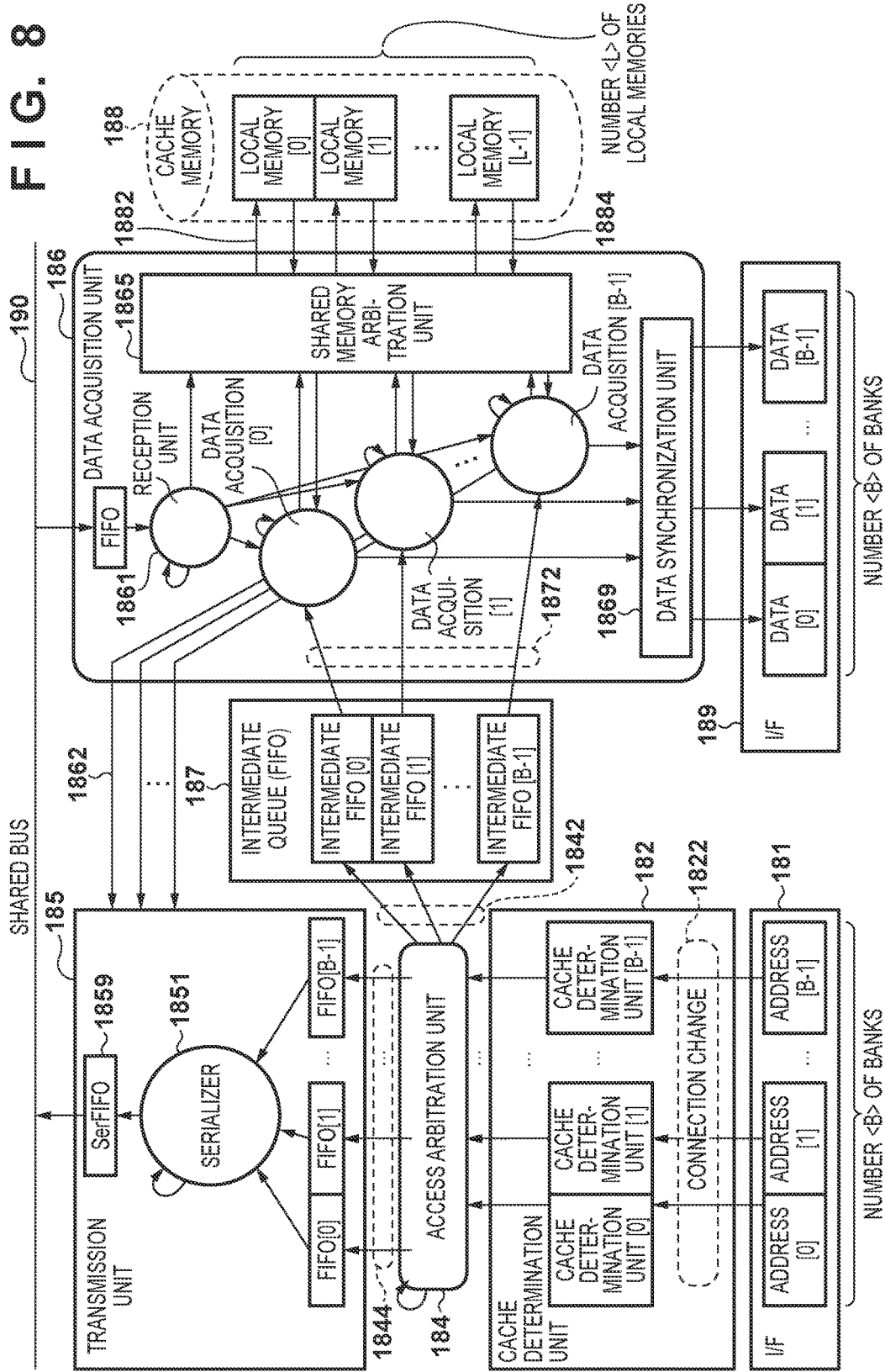
FIG. 8 is a block diagram showing the function and arrangement of a cache unit.

FIG. 8 is a diagram showing a detailed cache configuration for the number <B> of banks. There exist cache units equal in number to the number <B> of banks indicating the number of bank divisions. The cache determination unit 182 includes a cache determination unit [0] to a cache determination unit [B-1] in order to perform cache determination in parallel on an address [0] to an address [B-1], respectively, input from the I/F 181.

B cache determination results for the address [0] to address [B-1] are transmitted to the transmission unit 185 and the intermediate queue (FIFO) 187 via the access arbitration unit 184.

The transmission unit 185 includes B input FIFO [0] to FIFO [B-1] that receive B cache determination results (including addresses at the time of a cache miss) 1844. With respect to an address determined as the cache miss out of the B cache determination results 1844, the transmission unit 185 makes a data request to the shared bus 190 in order to acquire image data from the external memory such as the DRAM 106. The transmission unit 185 includes a serializer 1851. The serializer 1851 confirms whether the cache determination result is the cache miss sequentially from the FIFO [0]. If the result is the cache miss, the serializer 1851 writes an address for the data request in SerFIFO 1859 in order to output it to the shared bus 190. The serializer 1851 repeats the same operation from the FIFO [0] to the FIFO [B-1]. At this time, the transmission unit 185 and the serializer 1851 receive, from the data acquisition unit 186, B prefetch permission signals 1862 corresponding to the number <B> of banks. If the prefetch permission signal of a corresponding bank is "prohibition", the serializer 1851 waits without writing the address of cache miss determination in the SerFIFO 1859 until the permission signal becomes "permission".

As shown in FIG. 8, the intermediate queue (FIFO) 187 includes B intermediate FIFOs [0] to [B-1]. B determination results are transmitted to the data acquisition unit 186 via the intermediate queue (FIFO) 187.

The data acquisition unit 186 includes B data acquisitions [0] to [B-1] and performs control by receiving a cache determination result 1872 from the B intermediate FIFOs.

The cache memory 188 includes a plurality of local memories [0] to [L-1] such as SRAMs. The number <L> of local memories is decided in consideration of the image format and the pixel interpolation method, and may be different from the number <B> of banks. In this embodiment, the image format is the 8-bit raster, and the pixel interpolation method is bilinear, and thus the number <L> of local memories may be four.

The data acquisition unit 186 includes a shared memory arbitration unit 1865. The shared memory arbitration unit 1865 obtains and arbitrates a maximum of B access requests from the data acquisitions [0] to [B-1], and reads/writes them from/in the local memories [0] to [L-1] to be accessed by the cache memory 188. The shared memory arbitration unit 1865 transmits L read/write requests 1882 to the L local memories [0] to [L-1]. In response to the L read/write requests 1882, the L local memories [0] to [L-1] return L read/write responses 1884 to the shared memory arbitration unit 1865. Therefore, the shared memory arbitration unit 1865 can perform a maximum of L access operations per cycle. The cache memory 188 is thus shared by the B data acquisitions [0] to [B-1] (the cache memory 188 may be referred to as a shared memory hereinafter).

When the cache determination result of one of the data acquisitions [0] to [B-1] is a cache hit, this data acquisition reads out cache data from a desirable local memory via the shared memory arbitration unit 1865 and sends it to a data synchronization unit 1869. It is also possible to access a plurality of local memories from one data acquisition, and such an operation will be described later. When access concentrates on one local memory, that is, a conflict arises in which the plurality of data acquisitions request access to one local memory, the shared memory arbitration unit 1865 conducts access arbitration and issues the read/write requests 1882 sequentially. When the access conflict arises as described above, it is impossible to collect B pixel values concurrently from the data acquisitions [0] to [B-1]. Thus, the data synchronization unit 1869 waits until the B pixel values are collected and sends data [0] to data [B-1] to the I/F 189 when all the pixel values are collected. Note that the operation of the data acquisition unit 186 when the cache determination result is the cache miss will be described later.

Bank Allocation Method of Image Data on DRAM 106

Figure 9:
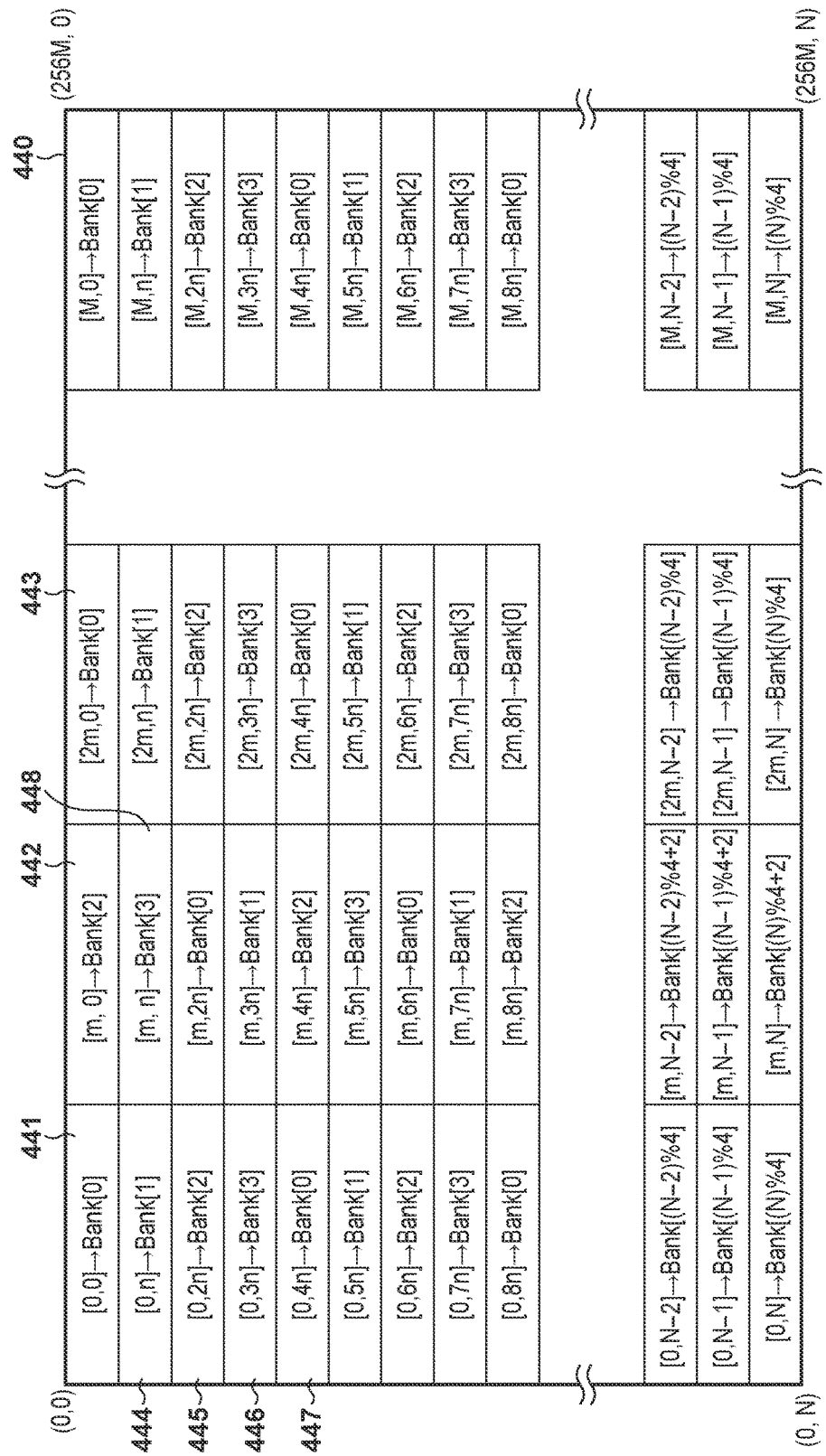
FIG. 9 is a table for explaining a method of storing image data and bank allocation on a DRAM.

FIG. 9 is a table for explaining a storage method and bank allocation of image data 440 on the DRAM 106. This bank is not a physical bank of the DRAM but a logical bank obtained by giving a numerical name to an aggregate of pixels. The image data 440 has a size of 256M pixels in a main scanning direction and N pixels in the sub scanning direction. Reference numeral 441 in FIG. 9 denotes data sent by one transfer in the aforementioned image format (8-bit raster), that is, a transfer unit. For example, when a transfer length is 256 Bytes (16 beats), data corresponding to one memory access, that is, 256 pixels in the range of coordinates [0, 0] to [255, 0] are held in the transfer unit 441. In order to cope with a raster image format, it is desirable that a bank allocation method using bank interleave switches banks for each line in the sub scanning direction. That is, the transfer unit 441 is set as a bank [0], a transfer unit 444 is set as a bank [1], a transfer unit 445 is set as a bank [2], a transfer unit 446 is set as a bank [3], and a transfer unit 447 is set as a bank [0] in FIG. 9, circulating bank numbers. In this embodiment, it is necessary to cope with the pixel interpolation method (bilinear). More specifically, in one pixel interpolation operation, 2×2 pixels need to be sampled as shown in FIG. 7. Therefore, if adjacent 2×2 pixels are allocated to different banks, the plurality of local memories that form the cache memory 188 do not conflict with each other. For example, considering that the transfer unit 441 is the bank [0], and the transfer unit 444 is the bank [1] in FIG. 9, the transfer unit 442 can be the bank [2]. The bank numbers of the second column are thus circulated as the bank [3], bank [0], bank [1], and bank [2] in the sub scanning direction. As described above, in this embodiment, the transfer length is determined, and the bank numbers are determined in consideration of the pixel interpolation method (bilinear) in the transfer unit, performing bank interleave (first interleave method).

Method of Pixel Assignment to Cache Memory (Shared Memory) 188 Formed by Plurality of Local Memories Pixel assignment to the plurality of local memories that form the cache memory 188 will be described with reference to FIG. 10A. In this embodiment, the cache memory (shared memory) 188 is formed by, for example, four local memories. The shared bus (system bus) 190 is 128 bits (16 Bytes), and thus in this embodiment, the bus width of one local memory is determined as 128 bits to match the shared bus (system bus) 190. The total capacity of the cache memory 188 becomes equal to the number of cache entries×the number <B> of banks×transfer length, and the capacity of one local memory is obtained by dividing the total capacity by the number <L> of local memories. The bus width of one local memory is the same as the bus width of the shared bus 190. It is therefore possible to store 1-packet (1-beat) data in one storage area of the local memory (one word for the SRAM). 16 pixels (pixel segments) are stored in the 1-packet (1-beat) data.

Figure 10A:
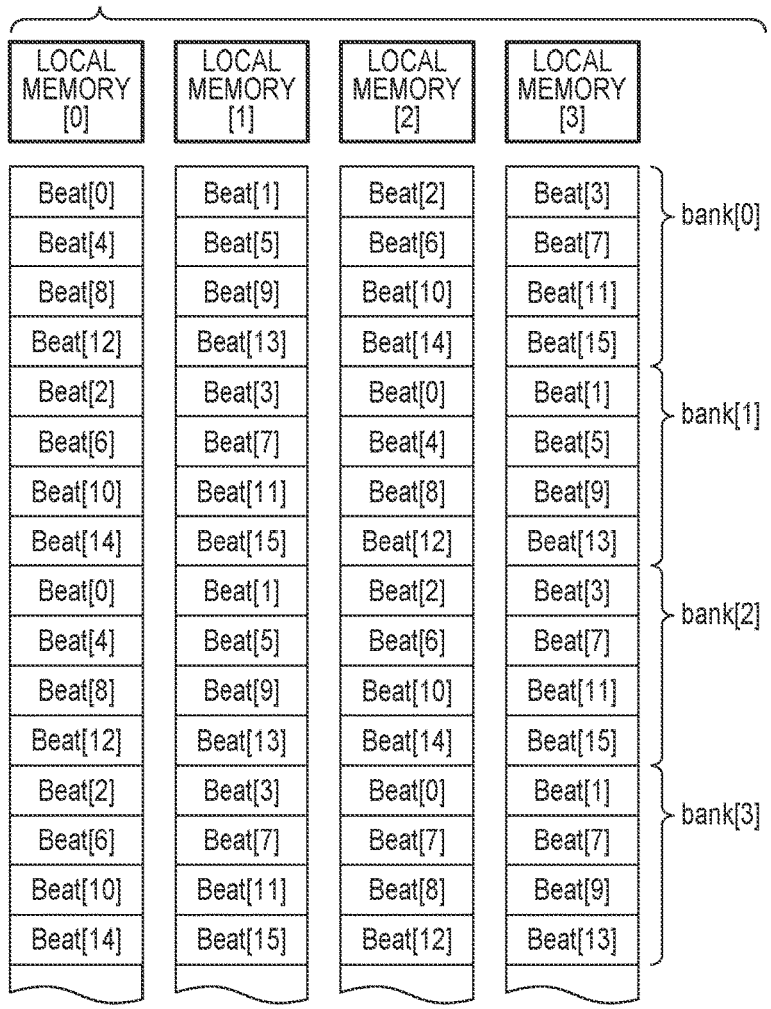
FIGS. 10A and 10B are views for explaining pixel assignment to a plurality of local memories that form a cache memory.

As shown in FIG. 10A, when data for one transfer length is stored in the plurality of local memories, a local memory to be a storage destination is switched in a 1-packet (1-beat) unit. The respective packets of the bank [0] and bank [2] are stored in the order of local memories [0], [1], [2], [3], [0], .... The respective packets of the bank [1] and bank [3] are stored in the order of the local memories [2], [3], [0], [1], [2], .... FIG. 10A shows an example of a storage method. However, another storage method may be used and, for example, a plurality of packets corresponding to a certain bank may be stored in four continuous words of a local memory.

In contrast to bank interleave, storing the packet of image data in a different local memory for each packet will be referred to as packet interleave (second interleave method). A plurality of pixel regions (pixel segments) stored in the 1-packet (1-beat) unit are different depending on an image format. Consequently, the packet is stored in the different local memory for each pixel segment. Therefore, packet interleave may be referred to as pixel interleave (second interleave method).

In this embodiment, a bank number bk (bk=0, 1, 2, ..., B-1) and a local memory number lm (lm=0, 1, 2, ..., L-1) are expressed by:

$$bk=[(m \% 2)*B/2+n] \% B \quad (1)$$

where m is a main scanning coordinate of the transfer length, n is a sub scanning coordinate of the transfer length, and B is the number of banks, and $$lm=[(bk \% 2)*L/2+\text{beat}] \% L \quad (2)$$

where beat is a packet number, and L is the number of local memories.

Method of Access to DRAM 106

In the pixel interpolation method (bilinear), 2×2 pixels are sampled as shown in FIG. 7. As is apparent from FIG. 9, 2×2 pixels are stored in different transfer lengths (transfer units) by using a bank interleave method of this embodiment. When pixel interpolation is performed from four points of, for example, coordinates (0, 0), (1, 0), (0, 1), and (1, 1), (0, 0) and (1, 0) are included in the bank [0], and (0, 1) and (1, 1) are included in the bank [1], respectively. When pixel interpolation is performed from four points of, for example, coordinates (15, 0), (16, 0), (15, 1), and (16, 1), these four points are, respectively, included in the bank [0], the bank [2], the bank [1], and the bank [3].

In the former case, an appropriate address [0] and address [1] are input to the cache unit 180, and an address [2] and an address [3] are invalidated. The circuits of the bank [0] and bank [1] in the cache unit 180 are used, and the circuits of the bank [2] and bank [3] are not used. On the other hand, in the latter case, the appropriate address [0] to address [3] are input to the cache unit 180, and all the circuits of the bank [0] to bank [3] in the cache unit 180 are used. Following the bank interleave method according to the image format, the address generation unit 1533 requests, from the cache unit 180, cache data of a transfer unit in which a desirable pixel is stored.

The cache unit 180 may return, to the image processing execution unit 153, four cache data of the transfer length (256 Bytes) that include 2×2 pixels. Originally, 2×2 pixels will functionally suffice if they return data for four pixels (8×4=32 bits if one pixel is represented by 8 bits). In the above-described arrangement, however, they return data for 1,024 pixels (256 Bytes×4), and it is wasteful in terms of both a circuit and power consumption. To cope with this, data corresponding to four pixels are selected in packet units (128 bits or 16 pixels), and selected packets are returned to the pixel sampling unit 1535 as desirable cache data. This makes it possible to reduce an unnecessary hardware resource while coping with various image formats and pixel interpolation methods in common.

Method of Access to Cache Memory (Shared Memory) 188

In this embodiment, in order to prevent a conflict in the cache memory 188, cache data of different packets in one bank are stored in different local memories following the packet interleave method. This operation will be described in detail with reference to FIGS. 11A and 11B.

Data 630, 632, 634, and 636 of a transfer unit shown in FIG. 11A, respectively, correspond to, for example, the image data 441, 442, and 444 and image data 448 of FIG. 9. Four adjacent data are arranged in different banks. Reference numerals 602, 604, 606, 608, 610, 612, 614, and 616 in FIG. 11A are data of a packet unit in these four data. In this embodiment, following the image format (8-bit raster), for example, 16 pixels of a to p are stored in the data 614 as denoted by reference numeral 615 of FIG. 11A.

Figure 11B:
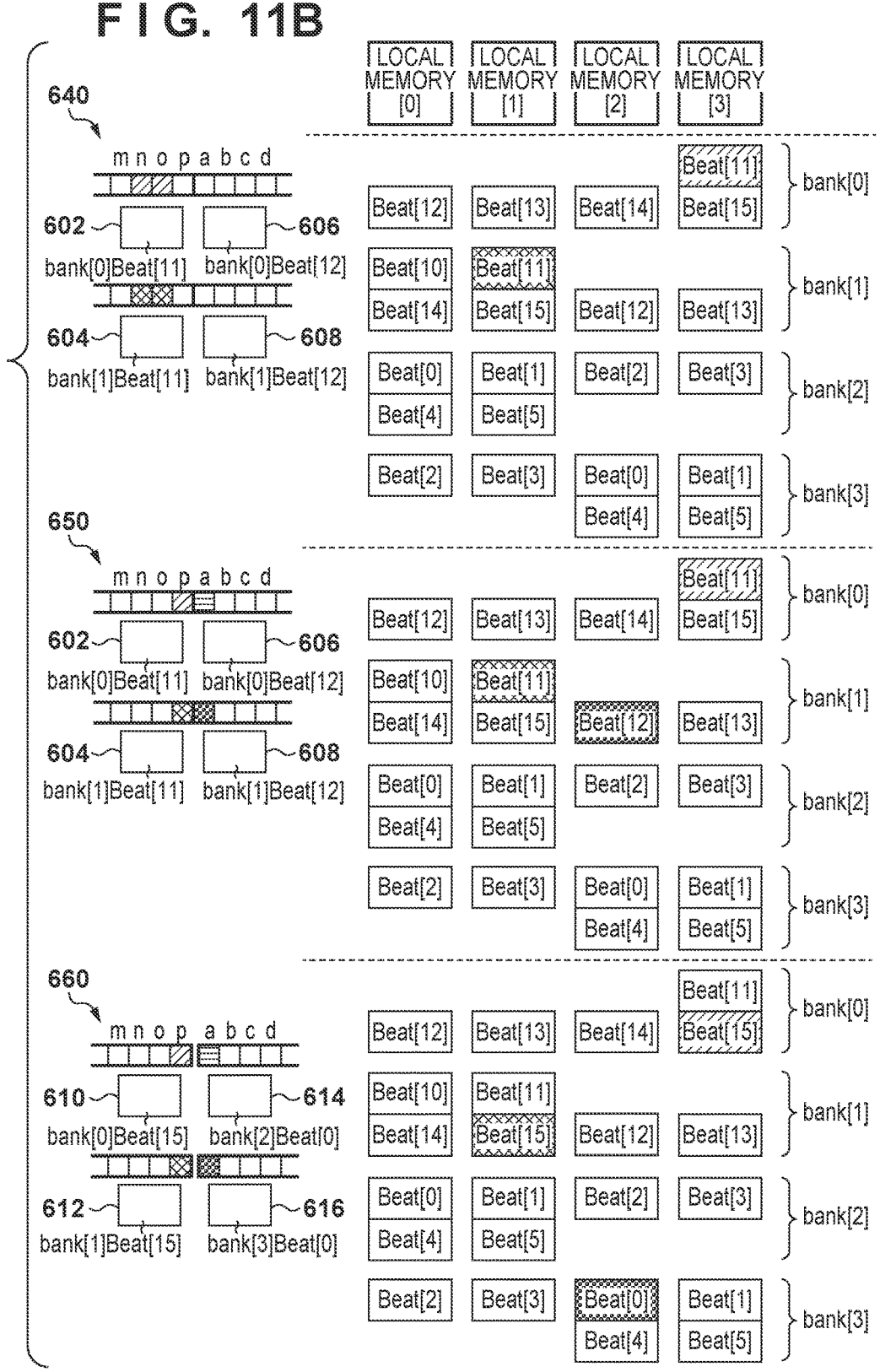

For example, as denoted by reference numeral 640 shown in FIG. 11B, a case will be considered in which 2×2 pixels which perform pixel interpolation are four pixels, namely, the pixels n and o of the packet 602, and pixels n and o of the packet 604. The pixels n and o of the packet 602 are stored in the local memory [3], and the pixels n and o of the packet 604 are stored in the local memory [1]. That is, two local memories that need access do not conflict thanks to the packet interleave method, allowing simultaneous access.

For example, as denoted by reference numeral 650 shown in FIG. 11B, a case will be considered in which 2×2 pixels which perform pixel interpolation are four pixels, namely, the pixel p of the packet 602, the pixel p of the packet 604, the pixel a of the packet 606, and the pixel a of the packet 608. As shown in FIG. 11B, the respective pixels are stored in the local memories [0] to [3] different from each other.

However, following the bank interleave method according to the image format, the address generation unit 1533 requests, from the cache unit 180, cache data of a transfer unit in which a desirable pixel is stored. The packet 602 and the packet 606 are included in the same bank, and thus the address generation unit 1533 only makes one access request to the two packets. The same also applies to the packet 604 and the packet 608.

Therefore, the shared memory arbitration unit 1865 has a function of compensating for a difference in arrangement between logical image data that have undergone bank interleave for the DRAM 106 and cache data for implementation that has undergone packet interleave for the cache memory 188.

More specifically, when 2×2 pixels which perform pixel interpolation cross the boundary of packet units, the shared memory arbitration unit 1865 divides, into two, one access request from any one of the data acquisitions and makes the access requests to two local memories concurrently. The shared memory arbitration unit 1865 extracts parts corresponding to pixels from two cache data from two local memories and combines them into one cache data. The shared memory arbitration unit 1865 returns the combined data to the data acquisition of a request source.

With the above-described control, it becomes possible to read out, by simultaneous access, four pixels of the packets 602, 606, 604, and 608 from four local memories without any conflict. Note that the present invention is not limited to a case in which 2×2 pixels which perform pixel interpolation cross the boundary of the packet units and, for example, the above-described control may be performed when an address value from the address generation unit 1533 shifts by half the packet length (16 Bytes), that is, a half packet length (8 Bytes). At this time, with respect to a Beat [11] and Beat [12] of two cache data read out from the local memories, the shared memory arbitration unit 1865 first extracts lower 8 Bytes of the Beat [11] and upper 8 Bytes of the Beat [12]. The shared memory arbitration unit 1865 combines both that are extracted to generate cache data of 1-packet length and returns it to the data acquisition. If the above-described control is performed in detail in a 1-Byte unit, it is possible to read out, from two local memories that have undergone packet interleave, needed cache data at arbitrary Byte positions.

For example, as denoted by reference numeral 660 in FIG. 11B, a case will be considered in which 2×2 pixels which perform pixel interpolation are four pixels, namely, the pixel p of the packet 610, the pixel p of the packet 612, the pixel a of the packet 614, and the pixel a of the packet 616. As shown in FIG. 11B, the respective pixels are stored in the local memories [0] to [3]. The packets 610, 612, 614, and 616 cross a bank boundary before crossing the boundary of the packet (pixel segment) units. In this case, there are four access requests from four data acquisitions related to four banks. Therefore, it becomes possible, according to the bank interleave method, to perform simultaneous access without conflicting four local memories that need access.

As described above, the image processing apparatus 10 according to this embodiment includes a logical bank interleave method (first interleave method) of image data stored in the DRAM 106. The image processing apparatus 10 further includes the packet interleave method (second interleave method) for implementation of cache data to be distributed and stored in the plurality of local memories. The image processing apparatus 10 includes the shared memory arbitration unit 1865 which compensates for the difference in arrangement between the logical image data that have undergone bank interleave and the cache data for implementation that has undergone packet interleave. As a result, even in a system with a comparatively large transfer length of DRAM access, it becomes possible to concurrently read out arbitrary 2×2 pixels needed for the pixel interpolation method (bilinear) from the cache memory (shared memory) 188 formed by four local memories without any conflict at all times.

Refill at Time of Cache Miss

Refill of the cache configuration in this embodiment will be described in detail below with reference to FIGS. 8 and 12. When the cache determination result is the cache miss, a data request is issued by a prefetch operation, and the data acquisition unit 186 is refilled with desirable refill data via the shared bus 190.

Upon receiving the desirable refill data, a reception unit 1861 sends the data to the shared memory arbitration unit 1865 and writes the refill data in the cache memory 188. The reception unit 1861 updates the reception state of the refill data by making a notification to one of the data acquisitions [0] to [B-1]. With respect to the cache memory 188, cache data is read out by the B data acquisitions [0] to [B-1] concurrently, in addition to writing these refill data. Therefore, the cache memory 188 is formed by a two-port SRAM capable of performing read/write operations concurrently. The shared memory arbitration unit 1865 makes the read request 1882 from the B data acquisitions [0] to [B-1] and the write request 1882 from the reception unit 1861 concurrently.

However, the two-port SRAM is generally larger in circuit scale than a one-port SRAM capable of performing only one of the read/write operations. It is therefore desirable that the cache memory 188 is formed by the one-port SRAM, if possible. To achieve this, as shown in FIG. 12, a control circuit 1868 is provided in the shared memory arbitration unit 1865. The shared memory arbitration unit 1865 receives the refill data from the reception unit 1861. At this time, refill data for one transfer length is divided into packets for each bus width, and such packets are input to the shared memory arbitration unit 1865 by time division. It is therefore considered that this is performed as a write operation in the local memory for each local memory in one cycle. The image processing apparatus 10 according to this embodiment includes the data synchronization unit 1869, allowing the cache device to perform a desirable operation even if all the read requests 1882 from the B data acquisitions [0] to [B-1] are not responded concurrently. However, if even one of the B data acquisitions [0] to [B-1] does not collect cache data, performance degrades, although slightly, in queuing in the data synchronization unit 1869.

To cope with this, the control circuit 1868 includes registers equal in number (L) to the local memories and a write counter. Each register stores refill data in a packet unit. The control circuit 1868 sequentially receives the packets of the refill data and stores each packet received in a corresponding one of the registers. The control circuit 1868 increments the write counter each time one packet is received and does not issue write requests until write data are collected in all the registers. Then, when the write data are stored in all the registers, the control circuit 1868 performs the write operation on all the local memories [0] to [L-1] concurrently in one cycle. In this method, the stop of data acquisition by refill to the cache memory 188 is calculated by a transfer length and the sum of the bus widths of the local memories. For example, when the transfer length of the refill data is 256-Byte transfer, and there are four 128-bit (16-Byte) local memories, a stop period per cache miss is calculated as four cycles (=256/16/4). As a result, the stop time of data acquisition by refill can be calculated in advance by obtaining the percentage of the cache misses, making it possible to predict processing performance of overall image processing. By predicting the processing performance, it can be decided whether to adopt the two-port SRAM or the one-port SRAM as the local memory.

Effect of This Embodiment

As described above, the method of this embodiment can suppress the performance degradation even if an access pattern to the external memory such as the DRAM 106 changes greatly in the image processing apparatus with the cache device. In the image processing apparatus 10 according to this embodiment, the conflict in the plurality of local memories that form the shared memory hardly arises even if the transfer length of data transfer increases in accordance with the DRAM standard. It is therefore possible to deform the plurality of images to make them have the same shape and to combine the plurality of images after deformation.

Modification

With the above described concept, it is possible to change design easily even if the transfer length changes by a change in DRAM standard to be used or the bus width of the system bus changes by a change in system specification. Even if it is necessary to optimize the transfer length of DRAM access due to the use case of a product, an operation can be performed without any problem in accordance with the transfer length by changing the setting of the cache device according to this embodiment. The number of pixels in the packet unit does not change even if the transfer length is changed as shown in FIG. 6A. If the storage destination of the local memory is decided by the method of equations (1) and (2), only the storage destination of the local memory for each word changes, making it possible to cope with an arbitrary transfer length.

This embodiment can suffice even in the case of an image format other than the image format (8-bit raster) as long as one pixel falls within the half packet length (8 Bytes). In this case, it is only necessary that an appropriate pixel value is extracted in accordance with the image format to be used in the pixel sampling unit 1535 of the image processing execution unit 153 in FIG. 2.

Figure 13:
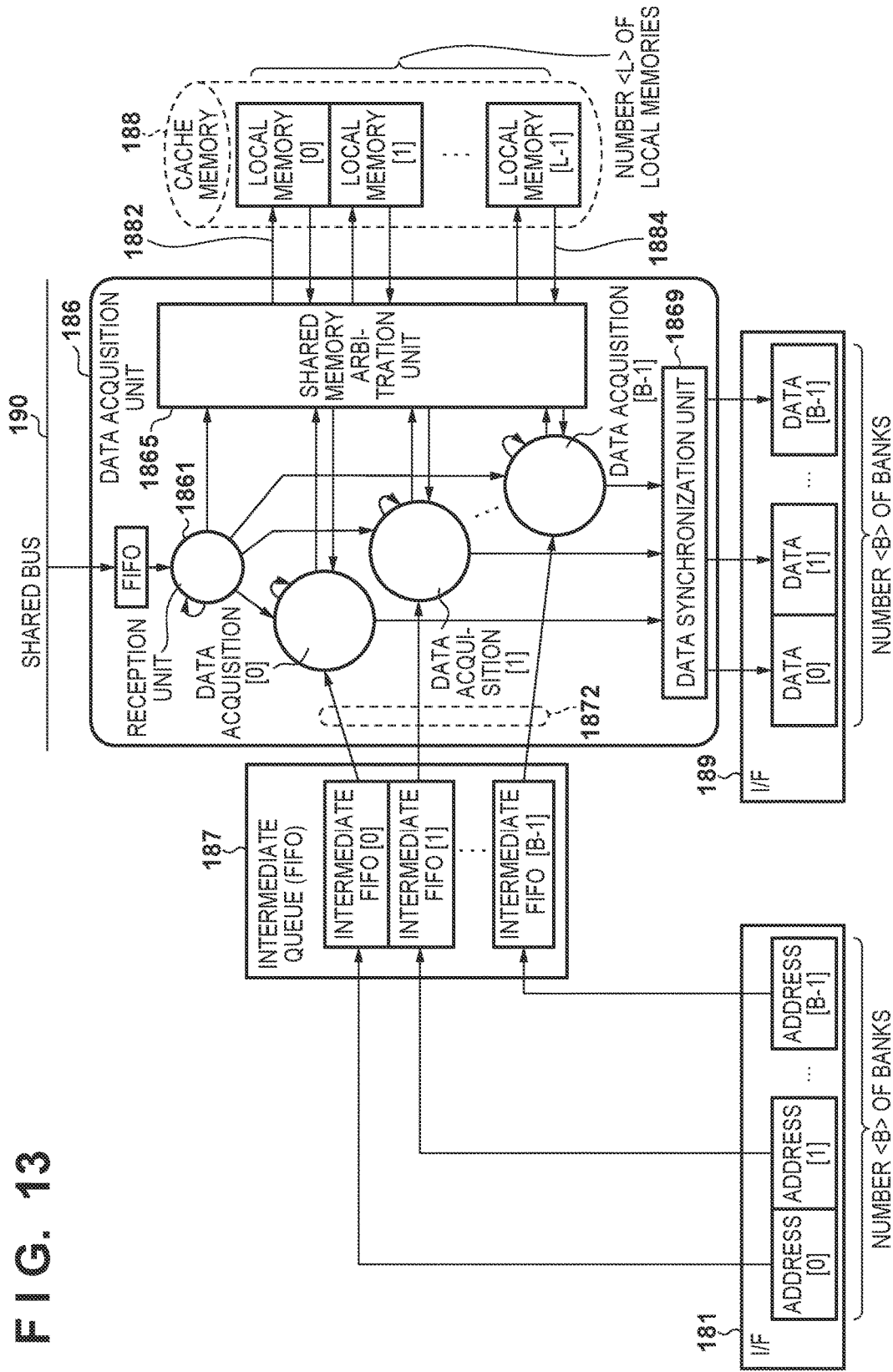
FIG. 13 is a block diagram showing the function and arrangement of the cache unit.

In this embodiment, the case has been described in which the image processing apparatus 10 includes the cache unit. However, the present invention is not limited to this. For example, if the capacity of the local memory is large enough to store all image data, a cache mechanism can be omitted as shown in FIG. 13. In that case, the cache memory 188 is treated as the shared memory formed by the plurality of local memories.

In this embodiment, the case has basically been described in which an image is deformed and rotated. However, the present invention is not limited to this. For example, two interleave methods adopted in this embodiment also hold for filtering on an image other than deformation and rotation. A technical idea according to this embodiment is also applicable to a case in which filtering is performed on an image stored in the external memory.

Figure 10B:
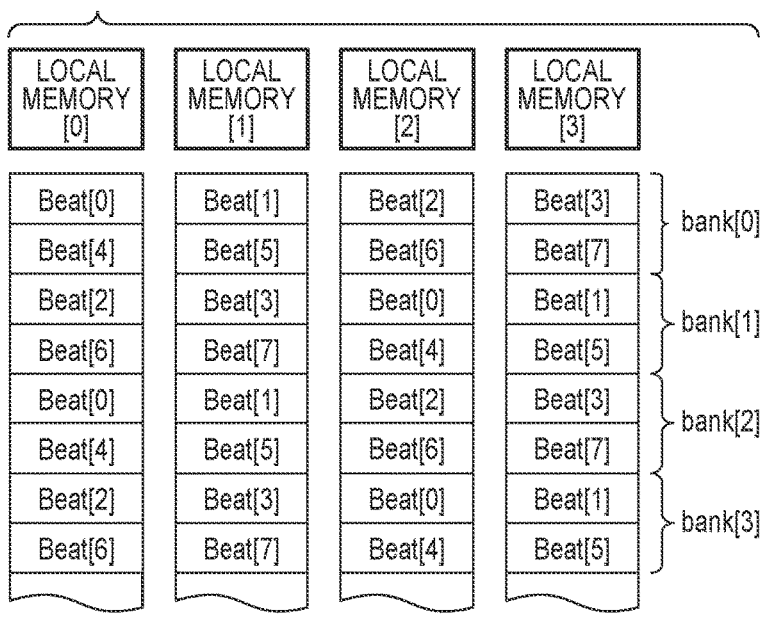

In this embodiment, the case has been described in which the transfer length is 256 Bytes. However, the present invention is not limited to this. For example, two interleave methods adopted in this embodiment also hold in a case in which the transfer length is 128 Bytes. In this case, a data amount per bank stored in the local memory only decreases as shown in FIG. 10B. That is, the technical idea according to this embodiment is applicable to an arbitrary transfer length. As a result, this embodiment functions more effectively by selecting or switching over to an appropriate transfer length in accordance with the contents of image processing or a system constraint such as the DRAM standard.

Second Embodiment

In the first embodiment, the method of performing bilinear interpolation on 2×2 pixels has been described. In the second embodiment, a bicubic pixel interpolation method using 4×4 pixels is used.

Pixel Interpolation Method (Bicubic)

In this embodiment, with respect to 16 points near four pixels in a main scanning direction×four pixels in a sub scanning direction, an interpolation coefficient of each pixel value is calculated from a coordinate fraction part of a shift amount from coordinate values at a center point, weighted interpolation is performed, and a pixel value at the center point is calculated (bicubic interpolation).

Image Format (10-Bit Y, Cb, and Cr Blocks)

Figure 14:
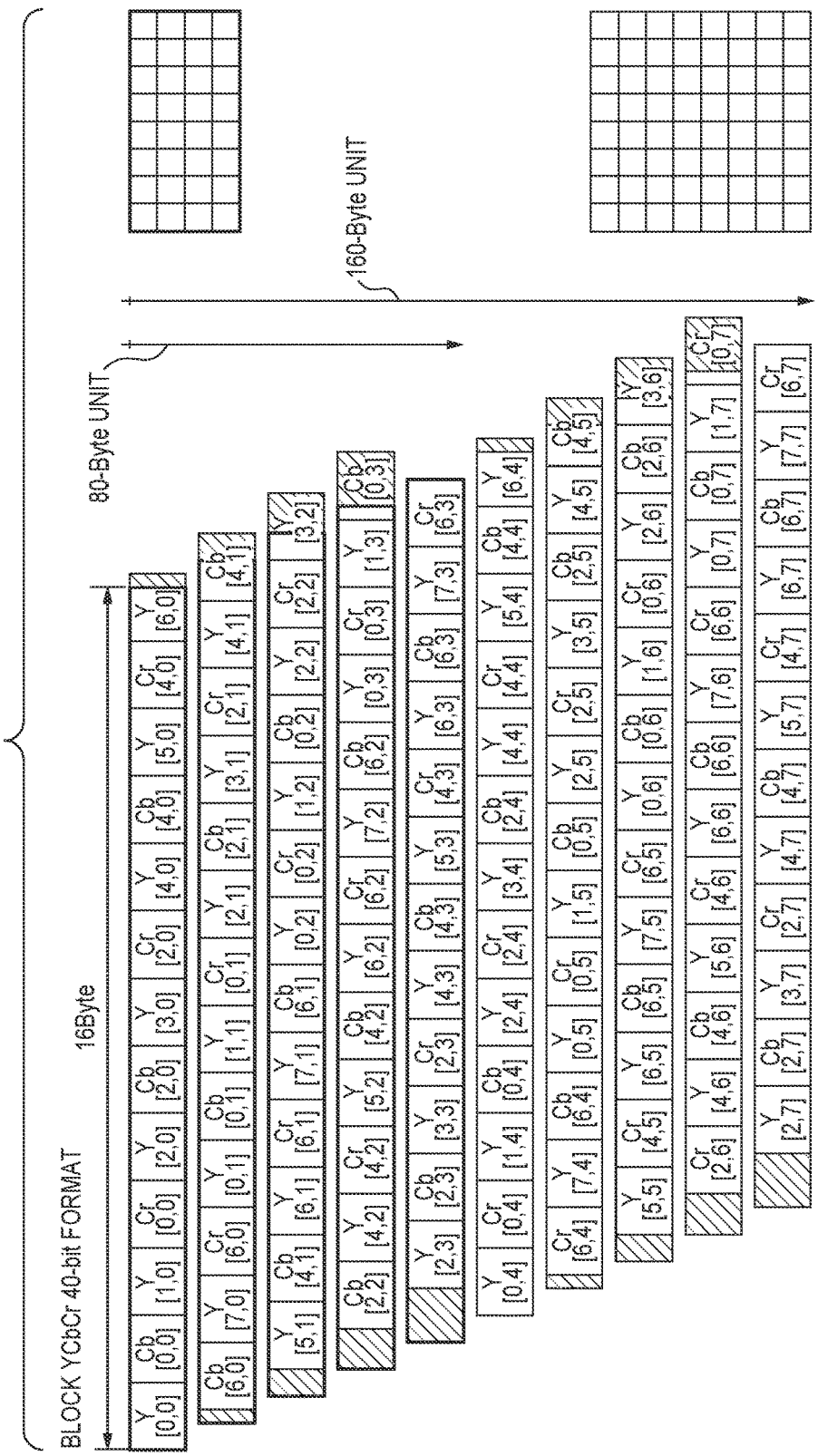
FIG. 14 is a view showing image data stored in a DRAM.

The structure of image data in this embodiment will be described in detail below. FIG. 14 shows image data stored in a DRAM 106. This image data is data of 10-bit Y, Cb, Cr block formats. 10-bit luminance data "Y", and color difference data "Cb" and "Cr" are packed in a 16-Byte (1-beat) unit. At this time, the respective components (color elements) Y, Cb, and Cr of the image data are handled with a 10-bit length, for example, in a two-pixel unit such as (Y[0, 0], Cb[0, 0], Cr[0, 0], and Y[1, 0]). Therefore, a pixel boundary is provided in the two-pixel unit (40-bit length).

Detailed Cache Configuration

On the other hand, a bus width is 16-Byte (1-beat) length, making it impossible to store all the pixels in the two-pixel unit (40-bit length). Consequently, as each hatched portion shown in FIG. 14, part of data in two-pixel unit (40-bit length) crosses a 16-Byte boundary and is stored in next data of a 16-Byte length. A pixel boundary of two-pixel unit (40-bit length) and the boundary of a bus width (16 Bytes (1 beat)) first match at 80-Byte (16 Bytes×5 beats) length of the least common multiple of a 40-bit length and 16 Bytes=128-bit length.

[0, 0] to [7, 3] in FIG. 14 represent [main scanning coordinate, sub scanning coordinate], and 8×4 pixels are packed in the aforementioned 80-Byte (5-beat) unit. Therefore, when a transfer length is, for example, 160 Bytes (10 beats), 64-pixel image data in the range of coordinates [0, 0] to [7, 7] is read/written per memory access. A cache device of this embodiment reads out image data from the DRAM 106 by using the 80-Byte (16 Bytes×5 beats) transfer length as a unit.

Bank Allocation Method of Image Data on DRAM 106

A storage method and bank allocation method of image data in the DRAM 106 are basically the same as a method described in the first embodiment with reference to FIG. 9. For example, if the transfer length is 80 Bytes (5 beats), 32 pixels in the range of coordinates [0, 0] to [7, 3] corresponding to one memory access are stored in a transfer unit 441 of FIG. 9. Image data 440 of FIG. 9 has a size of 8M pixels in the main scanning direction and 4N pixels in the sub scanning direction. For example, if the transfer length is 160 Bytes (10 beats), 64 pixels in the range of coordinates [0, 0] to [7, 7] corresponding to one memory access are stored in the transfer unit 441 of FIG. 9. Image data 440 of FIG. 9 has a size of 8M pixels in the main scanning direction and 8N pixels in the sub scanning direction.

Method of Pixel Assignment to Cache Memory (Shared Memory) 188 Formed by Plurality of Local Memories In a description below, the cache device of this embodiment reads out image data from the DRAM 106 by using 80-Byte (16 Bytes×5 beats) transfer length as a unit. The pixel boundary of two-pixel unit (40-bit length) and the boundary of the bus width of 16 Bytes (1 beat) do not match, making it impossible to perform pixel assignment as in the first embodiment in this state. To cope with this, in this embodiment, the bit length of a local memory (such as an SRAM) that forms the shared memory is adjusted not to the bus width of 16 Bytes but to the pixel boundary. Then, a pixel rearrangement circuit 1867 of a shared memory arbitration unit 1865 in FIG. 12 performs conversion from a data storage format on the DRAM 106 to a pixel storage format on a cache memory.

More specifically, the bit length of the local memory (such as the SRAM) is set not to 16 Bytes (128 bits) but to a 160-bit length as an integer multiple of two-pixel unit (40-bit length). Then, after a control circuit 1868 receives data of an 80-Byte (16 Bytes×5 beats) transfer length, a pixel value is extracted by using two pixels (40-bit length)×4 sets as a unit and packed in a 160-bit length. At this time, considering that bicubic interpolation of 4×4 pixels is performed in this embodiment, the pixel value is packed in the 160-bit length in the unit of 4×2 pixels. Then, the shared memory arbitration unit 1865 writes four cache data of a 160-bit length in four local memories [0] to [3], respectively.

The data has a transfer length of 5 beats (=80 Bytes), is divided into logical banks every 80 Bytes (=640 bits), and stored at the 160-bit length (the integer multiple of two pixels of 40 bits) in accordance with four as the number of local memories when stored at a transfer destination.

A bank selection method for the plurality of local memories and a calculation method of the addresses of the respective local memories will comply with a method used in the packet interleave method of the first embodiment. In the second embodiment, adjacent 4×2 pixels can be read out from four different local memories, making it possible to obtain adjacent 4×4 pixels for bicubic interpolation from the shared memory (cache memory) concurrently in one cycle.

Effect of This Embodiment

In the first embodiment, packet interleave (second interleave) for the shared memory is performed by using one packet (1-beat data transfer) as a unit. In this embodiment, it becomes possible, by further devising packet interleave for the shared memory in the first embodiment, to cope with even a case in which the boundary of transfer lengths and the pixel boundary do not match. In this embodiment, conversion is performed from an interleave method in a packet (1-beat data transfer) unit to an interleave method in the unit of a plurality of pixels (packet-pixel interleave conversion (second interleave method)).

Moreover, a method according to the second embodiment can extend not only to the 80-Byte (16 Bytes×5 beats) transfer length but also to the 160-Byte (10-beat) transfer length by the same extension method as an extension method according to the first embodiment.

Third Embodiment

In the third embodiment, extension to a raster image format of bicubic pixel interpolation will be described.

Image Format (10-Bit Y, Cb, and Cr Rasters)

Figure 15:
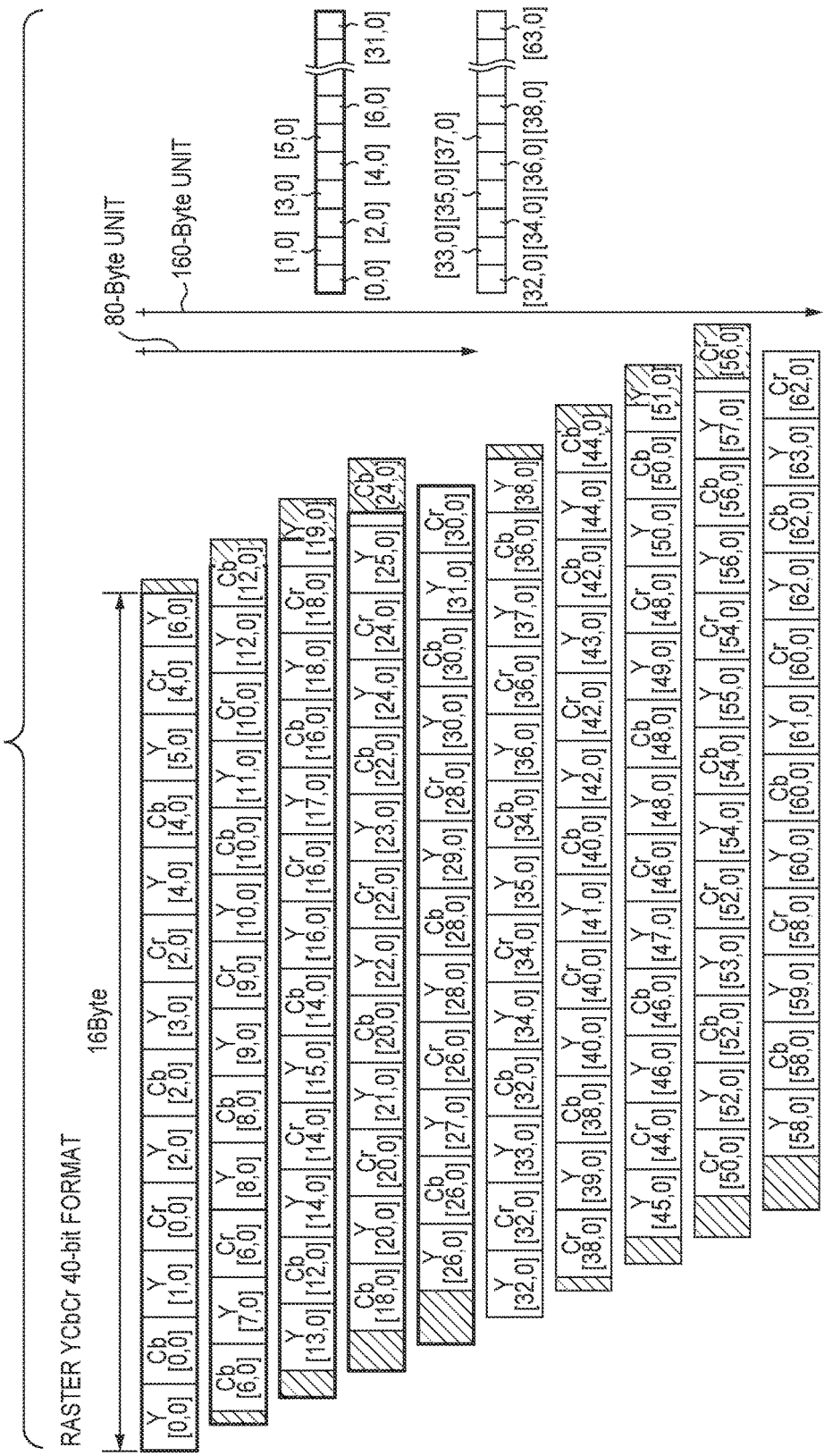
FIG. 15 is a view showing image data stored in a DRAM.

The structure of image data in this embodiment will be described in detail below. FIG. 15 shows image data stored in a DRAM 106. This image data is data in 10-bit Y, Cb, and Cr raster formats. As in the second embodiment, a pixel boundary is provided in a two-pixel unit (40-bit length), and pixels are packed in the 80-Byte (5-beat) unit. Note that the raster image format is used, and thus 32×1 pixels are stored in the 80-Byte (5-beat) unit as [0, 0] to [31, 0] in FIG. 15. For example, when a transfer length is 160 Bytes (10 beats), image data of 64 pixels in the range of coordinates [0, 0] to [63, 0] is read/written per memory access.

Bank Allocation Method of Image Data on DRAM 106

A storage method and bank allocation method of image data in the DRAM 106 are basically the same as a method described in the first embodiment with reference to FIG. 9. For example, if the transfer length is 80 Bytes (5 beats), 32 pixels in the range of coordinates [0, 0] to [31, 0] corresponding to one memory access are stored in a transfer unit 441 in FIG. 9. Image data 440 of FIG. 9 has a size of 32M pixels in a main scanning direction and N pixels in a sub scanning direction. For example, if the transfer length is 160 Bytes (10 beats), 64 pixels in the range of coordinates [0, 0] to [63, 0] corresponding to one memory access are stored in the transfer unit 441 in FIG. 9. Image data 440 of FIG. 9 has a size of 64M pixels in the main scanning direction and N pixels in the sub scanning direction.

Detailed Cache Configuration

In the first and second embodiments, the case has been described in which the cache memory 188 includes four caches (the number of banks=4). In this embodiment, the number of banks of a cache is increased to eight in order to perform bicubic pixel interpolation using 4×4 pixels on a raster image with a throughput of one pixel/one cycle. Basically, as in the second embodiment, the number of local memories (such as SRAMs) of a 160-bit length can be increased to eight. For bicubic pixel interpolation, desirable performance can be achieved if four pixels in the main scanning direction can be obtained concurrently from one local memory. Therefore, eight local memories (such as the SRAMs) of an 80-bit length are provided. The number of words of the local memories (such as the SRAMs) is doubled in order to make the capacities of the local memories equal. In general, a circuit scale is smaller by being formed with a 160-bit length than by being formed with an 80-bit length also in the SRAM of the same capacity, making it possible to suppress a circuit scale of an overall apparatus.

Figure 12:
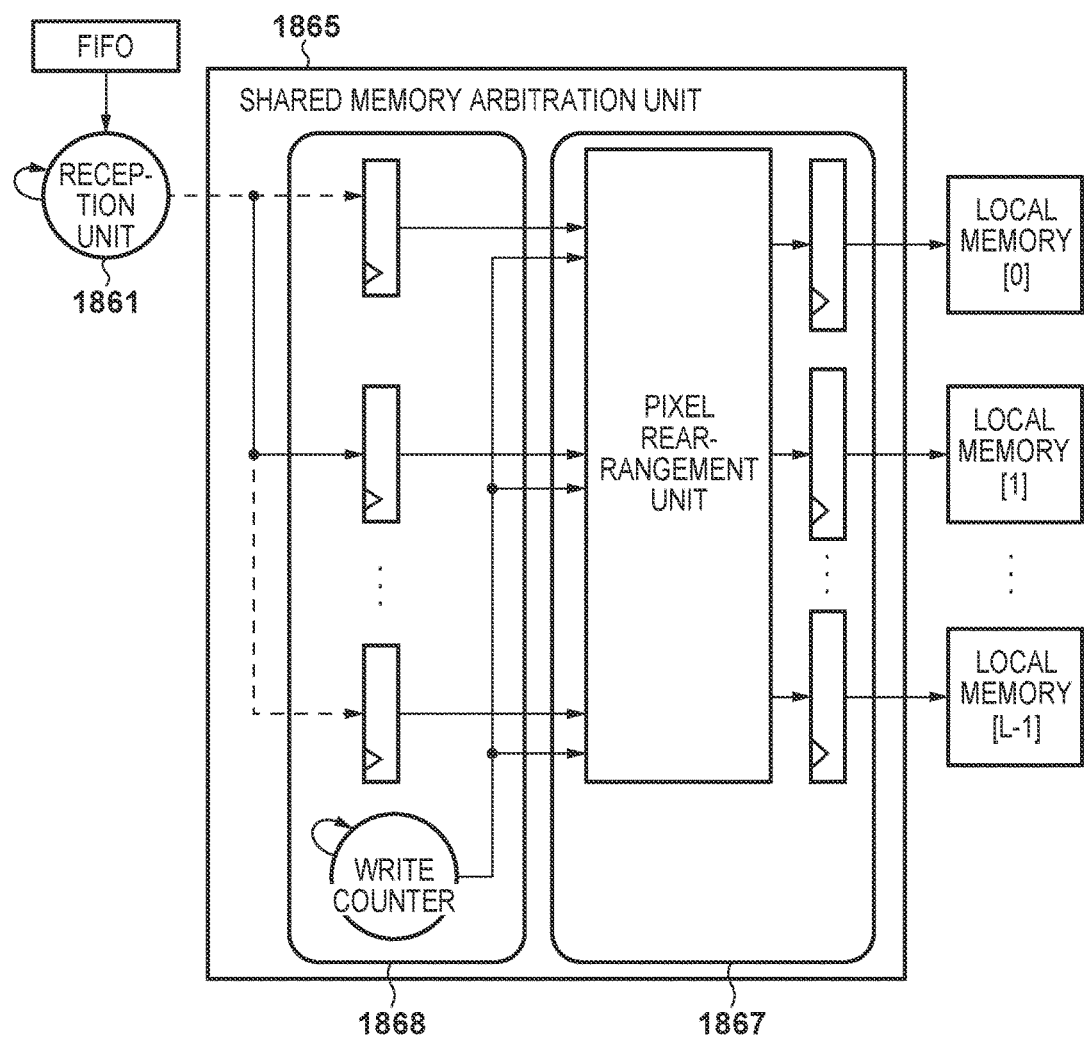
FIG. 12 is a block diagram showing the function and arrangement of a shared memory arbitration unit.

Method of Pixel Assignment to Cache Memory (Shared Memory) 188 Formed by Plurality of Local Memories As in the second embodiment, a pixel rearrangement circuit 1867 of a shared memory arbitration unit 1865 described in FIG. 12 compensates for a difference between the bus width of 16 Bytes (1 beat) and the bit length of the local memory (such as the SRAM) that forms the cache memory 188.

More specifically, after data of an 80-Byte (16 Bytes×5 beats) transfer length is received in refill corresponding to one cache miss, the shared memory arbitration unit 1865 extracts a pixel value assuming that 2 pixels (40-bit length)×2 sets and packs it in an 80-bit length. The shared memory arbitration unit 1865 writes eight sets of data of an 80-bit length in eight local memories [0] to [7], respectively.

A bank selection method for the plurality of local memories and a calculation method of the addresses of the respective local memories can be decided by extending a method used in the packet interleave method of the first embodiment to eight banks. Pixel segments (4×1 pixels) for four lines in the sub scanning direction need to be obtained concurrently, assigning the pixel segments of these four lines to four different banks. Two adjacent pixel segments (4×1 pixels) are assigned to two different banks in the main scanning direction. As a result, adjacent 2×4 sets of pixel segments (4×1 pixels) can be read out from eight different local memories, making it possible to obtain adjacent 4×4 pixels for bicubic interpolation from the shared memory (cache memory) 188 concurrently in one cycle. Based on the first and second embodiments, a cache unit of four-bank configuration can be extended to a cache unit of eight-bank configuration.

Effect of This Embodiment

With the above-described method, it is possible to implement deformation/rotation processing using bicubic pixel interpolation of a raster image. An increase in circuit scale is suppressed by controlling the bit lengths of the plurality of local memories that form the shared memory to be smaller than 1 packet (1-beat data transfer) in contrast to an increase in the number of banks of the cache unit.

Fourth Embodiment

In the above-described embodiments, the cache device capable of changing the transfer length and the number of banks of image data in the raster image format or block image format has been described. The problem of the above-described embodiments is that the images are combined while synchronizing the plurality of image data by rotating or deforming them. In particular, if image data of a raster image format is rotated or deformed, the following problem may arise depending on a refill transfer length with respect to a cache miss.

In image data of a raster image format as shown in FIGS. 6B, 6C, or 15, pixels are arranged in the main scanning direction of an image. For example, in luminance (mono) data of an 8-bit raster image format shown in FIG. 6B, 16 pixels are packed in a 16-Byte (1-beat) unit. Accordingly, 128-pixel data can be read/written if a transfer length is 128 Bytes (8 beats), and 256-pixel data is read/written if a transfer length is 256 Bytes (16 beats).

A case will be considered in which the size of a tile area is 64×64 pixels in image processing of tile scan as shown in FIG. 7. The first tile area is [0, 0] to [63, 63], the second tile area is [64, 0] to [127, 63], and the third tile area is [128, 0] to [191, 63], and tile processing is performed on these tile areas.

For example, tile processing when the image is not rotated (rotation angle=0°) will be as follows. First, an image processing apparatus reads out the pixels of [0, 0] to [255, 0] from a DRAM via a cache device with the transfer length of 256 Bytes (16 beats). As tile scan progresses, the image processing apparatus sequentially reads out, in a sub scanning direction, the needed pixels of [0, 1] to [255, 1] and [0, 2] to [255, 2]. The image processing apparatus finally reads out the pixels of [0, 0] to [255, 63] and processes the first tile area of [0, 0] to [63, 63].

Then, the image processing apparatus processes the second tile area of [64, 0] to [127, 63]. However, the needed pixels have already been stored in a cache memory, and thus the image processing apparatus processes the second tile area without reading out a new pixel from the DRAM. Note that the image processing apparatus performs the same operation up to the fourth tile area and reads out the pixels of [256, 0] to [511, 0] from the DRAM with a cache miss in the fifth tile area. As described above, without rotating the image, all the pixels stored in the cache memory can be used for the image processing even if the transfer length is large, bringing about good efficiency.

On the other hand, tile processing when the image is rotated through 90° will be as follows. First, the image processing apparatus reads out the pixels of [0, 0] to [0, 255] from the DRAM via the cache device with the transfer length of 256 Bytes (16 beats). As tile scan progresses, the image processing apparatus sequentially reads out, in a main scanning direction, the needed pixels of [1, 0] to [1, 255] and [2, 0] to [2, 255]. The image processing apparatus finally reads out the pixels of [0, 0] to [63, 255] and processes the first tile area of [0, 0] to [63, 63].

Then, the image processing apparatus processes the second tile area of [64, 0] to [127, 63]. However, all the pixels stored in the cache memory cannot be used, and thus the image processing apparatus needs to newly read out the pixels of [64, 0] to [127, 255] from the DRAM. The image processing apparatus sequentially performs tile processing on the tile areas and reads out the pixels with a cache miss each time the tile area advances in the main scanning direction. The size of the tile area at this time is 64×64 pixels, and thus the pixels of [0, 0] to [0, 63] are used, but the pixels of [0, 64] to [0, 255] are discarded without being used even if they are read out from the DRAM.

Therefore, in this embodiment, the transfer length of the cache device is decreased in accordance with the size of the tile area when a raster image is rotated through 90°. If the size of the tile area is 64×64 pixels, the transfer length of the cache device is 64-Byte (4-beat) transfer, and 64-pixel image data is read out per refill. As a result, the number of pixels temporarily stored in the cache memory is controlled by changing the transfer length of the cache device so as to reduce the pixels ([0, 64] to [0, 255]) to be only discarded without being used as described above.

The control of 90-degree rotation has been described above. It is desirable, however, that an appropriate transfer length is selected in accordance with a clockwise rotation angle (degree of rotation). Assume that, for example, the maximum transfer length is 256 Bytes (16 beats), and the maximum number of transfer pixels is 256 pixels at the time of the above-described image format. Then, from a height TH of the tile area and a rotation angle θ, the number TP of pixels is calculated by:

$$\text{number } TP \text{ of pixels} = \text{height } TH \text{ of tile area}/\sin\theta \qquad (3)$$

where TH is the height of the tile area, and θ is the clockwise rotation angle. Then, a transfer length that exceeds the number TP of pixels and is smaller than the maximum number of transfer pixels of 256 can be selected.

Giving an example, when the height of the tile area is 64 pixels, and the rotation angle is 30°, the number TP of pixels is 128 pixels, and this number of pixels is smaller than the maximum number of transfer pixels of 256. Therefore, the transfer length can be 128 Bytes (8 beats) capable of transfer 128 pixels.

Effect of This Embodiment

According to this embodiment, it is possible, by selecting the appropriate transfer length in accordance with the rotation angle, to suppress unnecessary readout of the pixels that are not used in image processing. As a result, it is possible to optimize memory access to an external memory and to improve an access band (memory band) to the external memory.

Fifth Embodiment

In the fifth embodiment, image processing for each band area of image data when one-dimensional division is adopted as an area division method of the image data will be described with reference to FIGS. 16A to 16L and 17.

Band Processing

One-dimensional division of the image data is adopted as the area division method of the image data in this embodiment. Band processing as processing for each band area obtained by one-dimensional division will be described below.

In band processing, as shown in FIGS. 16A to 16D, one image data 300 is divided into belt-shaped band areas 301 to 304, and image processing is performed successively for each of these areas. Each band area is a divided long, narrow area. Each band area is obtained by dividing the image data in one of a main scanning direction and a sub scanning direction, and thus the band area and the image data match in length in one of the main scanning direction and the sub scanning direction. In an example of FIG. 16A, the image data is divided in the sub scanning direction, and the image data and each band area have the same length in the main scanning direction and have different lengths in the sub scanning direction. A storage area where each band area is expanded will be referred to as a band memory, and an action to divide the image data will be referred to as band division, hereinafter. The band memory can be secured in an appropriate storage area on a system. For the sake of descriptive simplicity, however, the band memory is secured as a storage area (global buffer) in a DRAM 106 here.

As shown in FIG. 16E, the coordinate system (main scanning direction–sub scanning direction) of the image data is defined by a coordinate system (band area coordinate system) in a lengthwise direction and height direction, and the band area is expressed by a length Bdl×height Bdh, hereinafter. The length Bdl of the band area, that is, the size of a side of the band area in the lengthwise direction is a value of one of the length of the image data in the main scanning direction and the length in the sub scanning direction. The height Bdh of the band area, that is, the size of a side of the band area in the height direction is an arbitrary value. In examples of FIGS. 16A to 16D, the lengthwise direction is the main scanning direction, and the height direction is the sub scanning direction. In contrast, if the image data is divided in the main scanning direction as shown in FIGS. 16I to 16K, the lengthwise direction is the sub scanning direction, and the height direction is the main scanning direction as shown in FIG. 16L. Band division shown in FIGS. 16I to 16K may be performed in a case in which, for example, the size of the image data in the main scanning direction is larger than in the sub scanning direction.

In band processing shown in FIGS. 16A to 16D, first, the first band area 301 is expanded in the band memory on the DRAM 106 and undergoes image processing. Then, the second band area 302 is overwritten and expanded in the band memory on the DRAM 106 where the first band area 301 is expanded, and undergoes image processing. Subsequently, the third band area 303 is overwritten and expanded in the band memory on the DRAM 106 where the second band area 302 is expanded, and undergoes image processing. Finally, the fourth band area 304 is overwritten and expanded in the band memory on the DRAM 106 where the third band area 303 is expanded, and undergoes image processing. As seen in FIGS. 16A to 16D, the band areas 301 to 304 have the same length but may not have the same height. Therefore, the height of the band memory is decided in accordance with the band area (the band areas 301 to 303 in FIGS. 16A to 16D) having the largest side in the height direction.

Figures 16F, 16G, 16H:
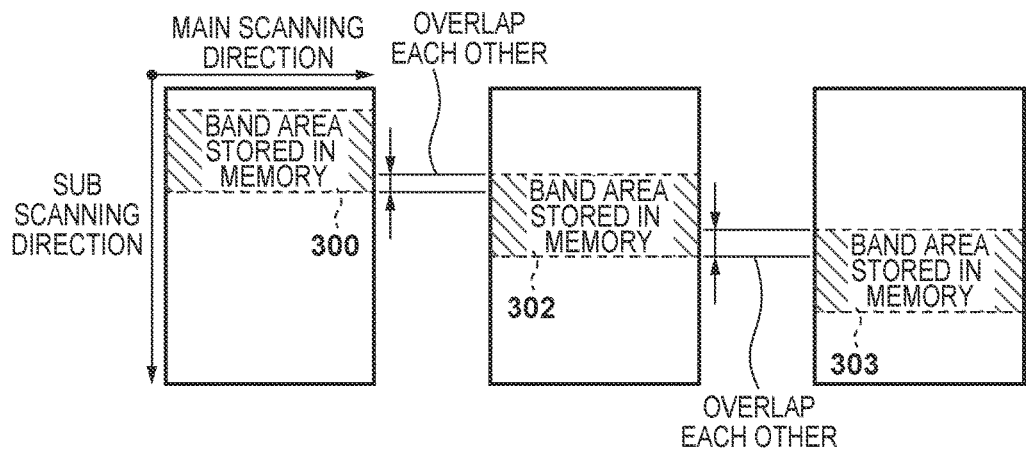
Figures 16I, 16J, 16K:
Figure 16L:
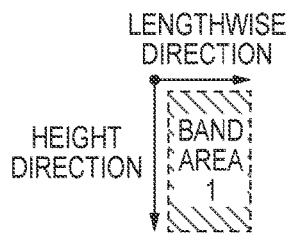

Note that in band processing of this embodiment, each band area is set so as to partially overlap the adjacent band area as shown in FIGS. 16F to 16H in order to perform local (neighborhood) image processing such as spatial filtering without any gap between the band areas.

Input/Output of Image Data

Input/output of image data, that is, transfer processing of image data from the DRAM 106 to an image input/output unit 152 or from the image input/output unit 152 to the DRAM 106 in this embodiment will be described in detail below with reference to FIG. 17. An image processing apparatus of this embodiment extracts the band area 301 (width Bdl×height Bdh) from one image data 300 and stores it in the DRAM 106 as input image data. As described with reference to FIG. 9, the input image data of this band area has a data structure using a predetermined transfer length as a unit to be handled easily in the DRAM 106.

Figure 17:
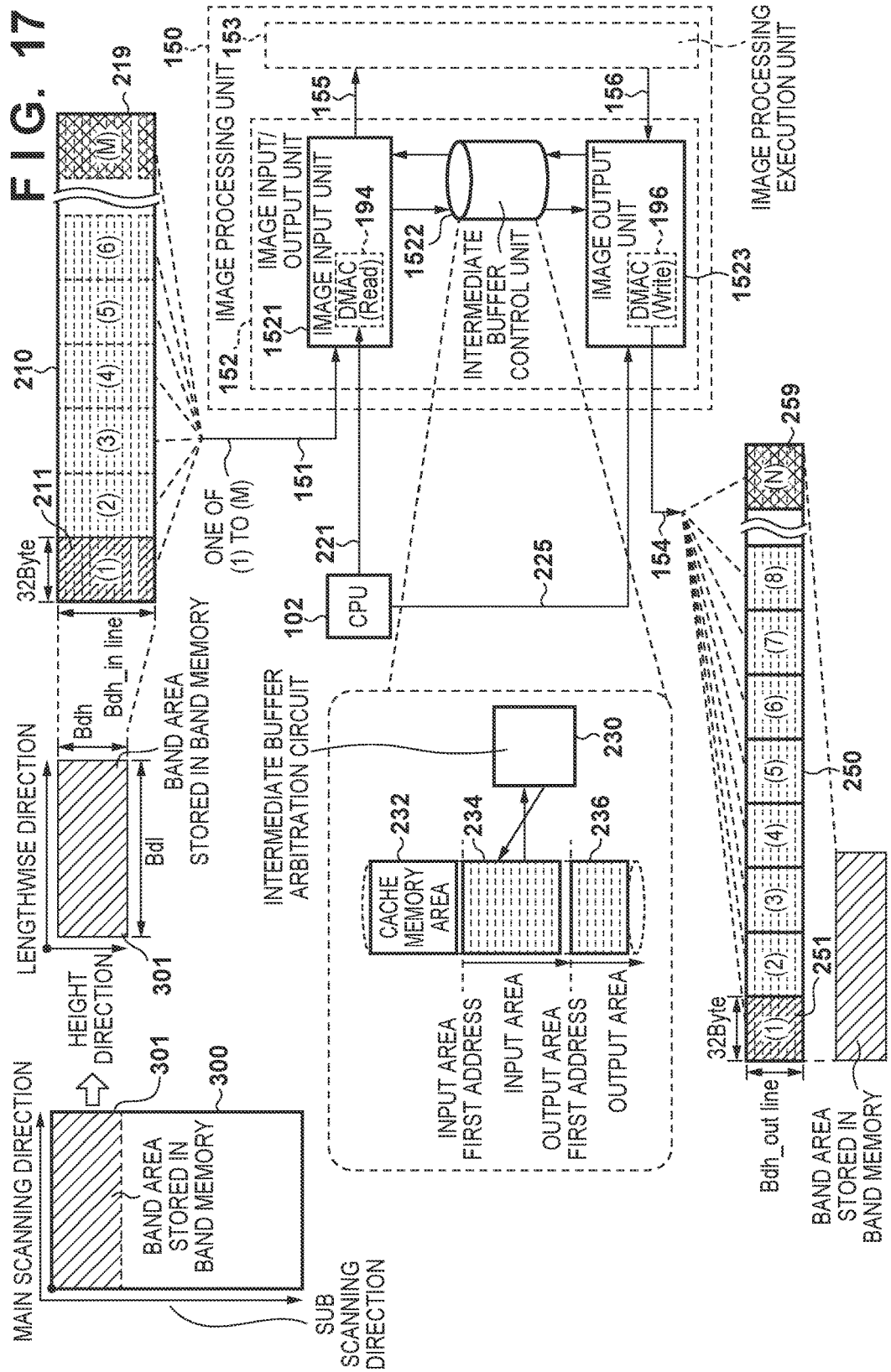
FIG. 17 is a view for explaining input/output processing of image data.

A DMAC 194 is activated in FIG. 17. The DMAC 194 reads out, from the DRAM 106, input image data 210 of this band area via a shared bus 190 shown in FIG. 1 and inputs it to an image processing unit 150. According to the above-described data structure, the input image data 210 is divided into M pixel regions (small regions) from a region (1) 211 to a region (M) 219 in the processing unit of width 32 Bytes×height Bdh_in. Then, the DMAC 194 sequentially reads out input image data of these M small regions from the small region (1) 211 to the small region (M) 219 and inputs them to the image processing unit 150. The image processing unit 150 receives the input image data of these small regions and performs image processing for each of these small regions.

The input image data is input to a pixel generation unit 1531 by switching a switch 1941 of FIG. 2. The pixel generation unit 1531 according to this embodiment converts the pixel value of the input image data into the coordinate value of the image data and outputs it to a coordinate transformation unit 1532. Note that deformation/rotation processing from the coordinate transformation unit 1532 is the same as in the first embodiment.

While receiving the input image data from the DMAC 194, an image input unit 1521 of the image input/output unit 152 transfers the data to an intermediate buffer control unit 1522. The intermediate buffer control unit 1522 includes an intermediate buffer arbitration circuit 230 and an intermediate buffer 232. In this embodiment, the area of the intermediate buffer is allocated to part of the shared memory (a plurality of local memories) as shown in FIG. 17. The intermediate buffer 232 is made of an input area 234 as an area for storing the input image data and an output area 236 as an area for storing output image data to be described later.

A CPU 102 determines a transfer length based on a deformation mode, a deformation amount, a rotation angle, an image format, a pixel interpolation format, or the like and allocates the area of a cache memory to the shared memory. Then, the CPU 102 allocates the input area and output area of the intermediate buffer 232 in accordance with the remaining capacity of a shared memory area. More specifically, the CPU 102 decides an input band height Bdh_in and an output band height Bdh_out based on the remaining capacity of the shared memory area. Based on the decided input band height and output band height, the CPU 102 then sets the first addresses of the input area and output area of the intermediate buffer 232 as an input area first address and an output area first address, respectively.

The intermediate buffer arbitration circuit 230 temporarily stores the received input image data in the input area 234 of the intermediate buffer 232. Subsequently, the image input unit 1521 reads out the temporarily stored input image data of the small regions via the intermediate buffer arbitration circuit 230, sequentially generates an input pixel value 155 for each pixel, and inputs it to an image processing execution unit 153. Note that the image input unit 1521 and an image output unit 1523 may operate asynchronously and, for example, a small region (1) 251 of the output image data may be generated and output by using parts of the small region (1) 211 and small region (2) in the input image data.

The image processing execution unit 153 performs image processing on a pixel region made of one or more input pixels. The image processing execution unit 153 advances such processing while sliding the pixel region in the height direction of the band area and performs a process for outputting a pixel of a next column after outputting a pixel value for one column in the height direction. The processed pixel value is output to the image output unit 1523 of the image input/output unit 152 for each pixel.

In the image output unit 1523, the output image data is generated from a processed output pixel value 156 and stored in the output area 236 of the intermediate buffer 232 via the intermediate buffer arbitration circuit 230 in a 32-Byte unit. Note that the data structure of the generated output image data remains in the image format shown in FIG. 9. However, the format may be changed in output image data 250. In the image processing execution unit 153, various image processing operations different in size between the input pixel region and the output pixel region are performed, and thus the input image data 210 and the output image data 250 are different in the number of pixels. Therefore, the height and width of the output band area of the output image data 250 are different from those of the input image data 210, and the height Bdh_out and the width 32×N are obtained. The height of the band area is different between the input image data 210 and the output image data 250 as described above, and thus the capacity of the small region as the processing unit is different. In addition, the width of the band area is also different, and thus the number of small regions also changes from M to N.

The image output unit 1523 stops receiving the output pixel value 156 from the image processing execution unit 153 at a point of time when the output image data of the small region (1) 251 are collected in the output area 236 of the intermediate buffer 232. The image output unit 1523 sequentially reads out the output image data of the output area 236 and sends them to a DMAC 196. In accordance with an instruction signal 225 from the CPU 102, the DMAC 196 writes the processed image data in the DRAM 106. The DMAC 196 sequentially performs the same operation from the small region (2) to a small region (N) and writes all the output image data of the output band area back to the DRAM 106.

Effect of This Embodiment

In this embodiment, the transfer length is determined in accordance with the standard of the external memory (such as the DRAM), the image format, or the pixel interpolation format, and the cache memory area is allocated to the shared memory in accordance with the transfer length. An appropriate band height is calculated and set for a remaining area obtained by excluding the cache memory area from the shared memory. An input image area and an output image area are allocated to the shared memory, reducing a circuit scale. With these methods, it is possible to implement complicated image deformation by inputting a deformation coordinate from the external memory (such as the DRAM).

Sixth Embodiment

It is possible to combine a plurality of images after performing different deformation or rotation processing operations on the plurality of images to make them have the same shape by using the first to fifth embodiments. A pixel generation unit 1531 of FIG. 2 sequentially generates pixels of the plurality of images. For example, when five images are combined, the pixel generation unit 1531 sequentially generates the pixels of five images and sends them to a coordinate transformation unit 1532 with respect to the same coordinate such as the coordinates [0, 0] of the first image, the coordinates [0, 0] of the second image, . . . , the coordinates [0, 0] of the fifth image. The pixel generation unit 1531 also sends image identification information concurrently. After sending the pixels of five images, the pixel generation unit 1531 sequentially generates the pixels of five images with respect to next coordinates [1, 0]. The coordinate transformation unit 1532 switches registers based on the image identification information and sequentially performs coordinate transformation according to the images. A cache device 180 switches cache tags and cache memories in accordance with the image identification information, and uses a different cache unit for each of the plurality of images. The cache device 180 reads out pixel segments needed for filtering with respect to the pixels of five images at the same coordinates to be input next and sends them to a pixel sampling unit 1535 sequentially. The pixel sampling unit 1535 extracts a plurality of pixels needed for filtering on the pixels of five images to be input sequentially and sends them to a pixel interpolation unit 1536. The pixel interpolation unit 1536 performs filtering on the pixels of five images to be input sequentially and sends them to a pixel combining unit 1537 sequentially. The pixel combining unit 1537 sequentially receives pixel values after filtering on the pixels of five images and when receiving all the pixels of five images, performs calculation for image combination and calculates an image combination value for one pixel. Then, the pixel combining unit 1537 sends, to a WDMAC 196, the pixel values after image combination. It is possible to implement the arbitrary number of image combinations by processing a series of pixels for the number of image combinations with respect to the same coordinates.

Effect of This Embodiment

According to this embodiment, it is possible to make the plurality of images have the same shape by performing the different deformation or rotation operations on them and to combine the plurality of images.

The arrangement and operation of the image processing apparatus according to the embodiments have been described above. Those skilled in the art will appreciate that these embodiments are merely examples, various modifications can be made to the combination of the respective constituent elements and processes thereof, and such modifications also fall within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-199409, filed Oct. 7, 2016, which is hereby incorporated by reference herein in its entirety.

What is claimed is:

1. An image processing apparatus that performs filtering by reading out an image from an external storage unit, the image being divided into a plurality of banks by a first interleave method according to a transfer length when the image is read out from the external storage unit, the apparatus comprising:
a plurality of local memories; and
a control unit configured to divide, into a plurality of pixel fragments, a pixel of a bank which includes at least one of a plurality of pixels needed for the filtering by a second interleave method according to the transfer length and store each of the pixel fragments obtained as a result of division in one of the plurality of local memories in accordance with the transfer length.

2. The apparatus according to claim 1, wherein the external storage unit stores an image before one of deformation and rotation, and
the image processing apparatus reads out the image before one of deformation and rotation from the external storage unit to perform filtering, and generates an image after one of deformation and rotation.

3. The apparatus according to claim 2, wherein the transfer length is set in accordance with a degree of one of deformation and rotation.

4. The apparatus according to claim 1, wherein the first interleave method and the second interleave method are implemented by calculating a bank number bk and a local memory number lm by:

$$bk=[(m\ \%\ 2)*B/2+n]\ \%\ B$$

$$lm=[(bk\ \%\ 2)*L/2+\text{beat}]\ \%\ L$$

where m is a main scanning coordinate of the transfer length, n is a sub scanning coordinate of the transfer length, B is the number of banks, beat is a packet number, and L is the number of local memories.

5. The apparatus according to claim 1, wherein a size of each of the pixel fragments is set in accordance with a bus width of a bus configured to connect the external storage unit and the control unit.

6. The apparatus according to claim 1, wherein a size of each of the pixel fragments is set in accordance with the number of pixels needed for the filtering.

7. The apparatus according to claim 1, wherein at time when the plurality of pixels are read out from the plurality of local memories, and the plurality of pixels needed for the filtering cross a boundary of the pixel fragments, the control unit converts one request from a corresponding bank into two requests to two local memories.

8. The apparatus according to claim 1, wherein the control unit rearranges pixels of the banks obtained as a result of division by the first interleave method into the pixel fragments of the second interleave method in accordance with bit lengths of the local memories and stores the pixel fragments in the local memories.

9. The apparatus according to claim 1, wherein the control unit sequentially holds pixels of the banks obtained as a result of division by the first interleave method and writes the plurality of pixel fragments in the plurality of local memories concurrently.

10. The apparatus according to claim 1, wherein the transfer length is set based on an image format.

11. The apparatus according to claim 1, wherein the transfer length is set based on an access latency.

12. The apparatus according to claim 1, wherein the number of banks in the first interleave method is set based on an image format and a pixel interpolation format of the filtering.

13. The apparatus according to claim 1, wherein a plurality of images undergo one of different deformation operations and rotation operations so as to have the same shape, and are combined.

14. The apparatus according to claim 1, further comprising a plurality of cache units corresponding to the plurality of banks,
wherein the plurality of cache units share the plurality of local memories, and
cache memories of the cache units are allocated to the plurality of local memories based on the transfer length.

15. The apparatus according to claim 14, wherein an input image and an output image divided into areas are allocated to an area obtained by excluding areas of the cache memories from areas of the plurality of local memories.

16. An image processing apparatus, comprising:
a readout unit configured to read out pixel data of an image associated with a plurality of banks by a first interleave method according to a transfer length when the pixel data is read out from an external storage unit;
a plurality of local memories;
a control unit configured to perform control for dividing a plurality of pixel data of a first unit associated with the banks into a plurality of pixel data of a second unit by a second interleave method in accordance with the number of local memories, and
for storing a plurality of pixel data corresponding to the banks sequentially in the plurality of local memories so that local memories with which the storing in the second unit is started are different among banks which have been consecutively read out; and
a filtering unit configured to perform filtering by using a pixel data group of pixels read out from the plurality of local memories and adjacent in the image.

17. A method for controlling an image processing apparatus that performs filtering by reading out an image from an external storage unit, the image being divided into a plurality of banks by a first interleave method according to a transfer length when the image is read out from the external storage unit, and the image processing apparatus including a plurality of local memories, the method comprising:
dividing, into a plurality of pixel fragments, a pixel of a bank which includes at least one of a plurality of pixels needed for the filtering by a second interleave method according to the transfer length and storing each of the pixel fragments obtained as a result of division in one of the plurality of local memories in accordance with the transfer length.

* * * * *